(12) United States Patent
Yamamoto et al.

(10) Patent No.: US 10,640,894 B2
(45) Date of Patent: May 5, 2020

(54) WOVEN FABRIC

(71) Applicant: DAIKI CO., LTD., Sakai-shi, Fukui (JP)

(72) Inventors: Takayoshi Yamamoto, Sakai (JP); Junnji Ikeda, Toyonaka (JP)

(73) Assignee: DAIKI CO., LTD., Sakai-shi, Fukui (JP)

(*) Notice: Subject to any disclaimer, the term of this patent is extended or adjusted under 35 U.S.C. 154(b) by 0 days.

(21) Appl. No.: 16/223,001

(22) Filed: Dec. 17, 2018

(65) Prior Publication Data

US 2019/0186057 A1  Jun. 20, 2019

(30) Foreign Application Priority Data

Dec. 19, 2017 (JP) .................. 2017-243311
Oct. 22, 2018 (JP) .................. 2018-198158

(51) Int. Cl.

| | |
|---|---|
| *D03D 1/00* | (2006.01) |
| *D03D 15/00* | (2006.01) |
| *F21V 8/00* | (2006.01) |
| *D03D 1/04* | (2006.01) |
| *D02G 3/44* | (2006.01) |

(Continued)

(52) U.S. Cl.

CPC ............ *D03D 1/0017* (2013.01); *B32B 5/26* (2013.01); *D02G 3/447* (2013.01); *D03D 1/04* (2013.01); *D03D 11/02* (2013.01); *D03D 15/0083* (2013.01); *G02B 6/001* (2013.01); *B32B 2307/202* (2013.01); *B32B 2307/40* (2013.01); *B32B 2307/758* (2013.01);

(Continued)

(58) Field of Classification Search

CPC .... D03D 1/0017; D03D 15/0083; D03D 1/04; D03D 11/02; B32B 5/26; B32B 2439/06; B32B 2307/202; B32B 2307/40; B32B 2307/758; B32B 2439/46; G02B 6/001; D02G 3/447; D10B 2401/20
See application file for complete search history.

(56) References Cited

U.S. PATENT DOCUMENTS

2017/0198244 A1* 7/2017 Gobel .................. C12M 21/02
2017/0261670 A1   9/2017 Yamada et al.
(Continued)

FOREIGN PATENT DOCUMENTS

| JP | 2009-084738 A | 4/2009 |
|---|---|---|
| JP | 2016-037688 A | 3/2016 |

(Continued)

OTHER PUBLICATIONS

Office Action of the corresponding EP application No. 18 212 967 dated May 8, 2019.
The European search report of 18 212 967 dated Apr. 23, 2019.

*Primary Examiner* — Kevin Quarterman
(74) *Attorney, Agent, or Firm* — Muncy, Geissler, Olds & Lowe, P.C.

(57) ABSTRACT

A woven fabric including: a fixing region where an optical fiber of a seventh fiber is held, and a light emitting region where the optical fiber of the seventh fiber is included to emit light. The woven fabric includes: aback layer in which a first fiber, a second fiber, and a sixth fiber are woven; a surface layer in which a third fiber, a fourth fiber, and a fifth fiber are woven; and the optical fiber arranged in a space of an intermediate layer between the surface layer and the back layer.

22 Claims, 26 Drawing Sheets

(51) Int. Cl.
  *B32B 5/26* (2006.01)
  *D03D 11/02* (2006.01)
(52) U.S. Cl.
  CPC ....... *B32B 2439/06* (2013.01); *B32B 2439/46* (2013.01); *D10B 2401/20* (2013.01)

(56) References Cited

U.S. PATENT DOCUMENTS

| | | | | |
|---|---|---|---|---|
| 2018/0094790 A1* | 4/2018 | Greene | .............. | H05B 33/0851 |
| 2018/0340684 A1* | 11/2018 | Yamada | ................. | D03D 15/00 |
| 2019/0013274 A1* | 1/2019 | Sunshine | ................ | H01L 33/62 |

FOREIGN PATENT DOCUMENTS

| | | | |
|---|---|---|---|
| JP | 2016037688 A | * | 3/2016 |
| JP | 2017-154674 A | | 9/2017 |
| JP | 2017-155381 A | | 9/2017 |
| JP | 2017-167223 A | | 9/2017 |
| JP | 2017-173457 A | | 9/2017 |
| JP | 2017-193799 A | | 10/2017 |
| JP | 2017-199580 A | | 11/2017 |
| WO | 2014/071898 A1 | | 5/2014 |

\* cited by examiner

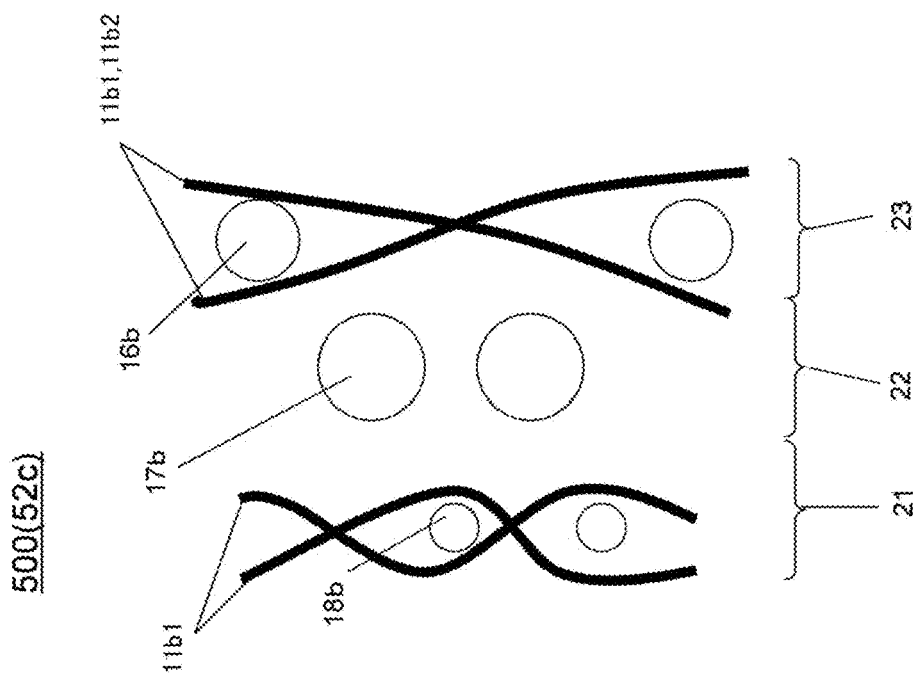
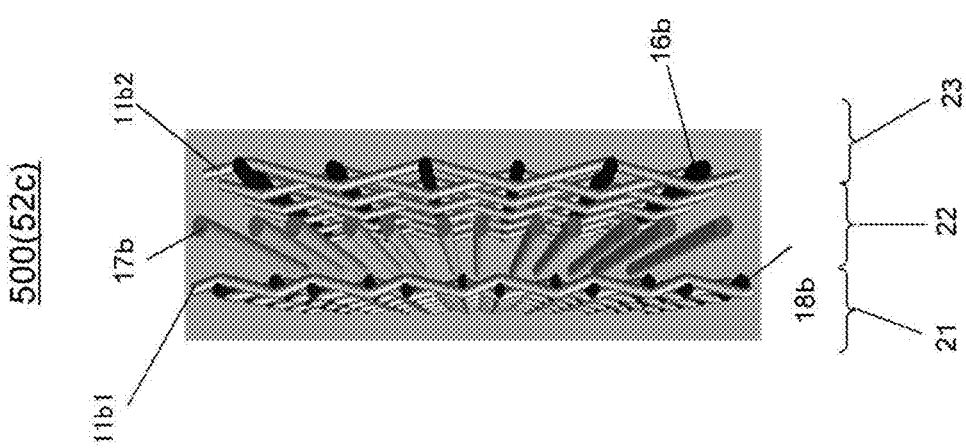

WOVEN FABRIC

FIELD OF THE INVENTION

The present disclosure relates to a woven fabric, and particularly to a woven fabric in which an optical fiber or a tubular body is put in a part of the woven fabric.

BACKGROUND OF THE INVENTION

A woven fabric in which an optical fiber is embedded in a part of the woven fabric has conventionally been taken into consideration. For example, Patent Document 1 discloses a woven fabric in which an optical fiber is embedded in a part of the woven fabric.

See, for example, Japanese Patent Laid-Open Publication No. 2009-084738.

SUMMARY OF THE INVENTION

However, Patent Document 1 does not disclose a method of weaving and manufacturing a woven fabric with a good light guiding property, in which in a complicated woven fabric with a high design quality, bending or compression of optical fibers is reduced as much as possible. The woven fabric includes, for example, a region where the optical fibers are located on the front surface of the woven fabric to emit light, and a fixing region where the optical fibers are hardly exposed on the front surface, and hidden, according to a design.

The present disclosure has been made in view of these problems, and an object thereof is to provide a woven fabric in which a location of, for example, an optical fiber or a tubular body is fixed within the woven fabric so that bending or compression of the optical fiber or the tubular body may be reduced so as to uniformly emit light or a gas such as scent.

In order to solve the above problems, there is provided a woven fabric including a fixing region where an optical fiber of a seventh fiber is held; and a light emitting region where the optical fiber of the seventh fiber is included to emit light. The woven fabric includes: a back layer in which a first fiber, a second fiber, and a sixth fiber are woven; a surface layer in which a third fiber, a fourth fiber, and a fifth fiber are woven; and the optical fiber arranged in a space of an intermediate layer between the surface layer and the back layer (FIGS. 1A to 1C).

There is provided a woven fabric including: a fixing region where an optical fiber of a seventh fiber is held; and a light emitting region where the optical fiber of the seventh fiber is included to emit light. The woven fabric includes: a surface layer in which a third fiber and a fifth fiber are woven; a back layer including a first fiber; and the optical fiber arranged in a space of an intermediate layer between the surface layer and the back layer (FIGS. 3A and 3B).

There is provided a woven fabric including: a fixing region where an optical fiber of a seventh fiber is held; a light emitting region where the optical fiber of the seventh fiber is included to emit light. The woven fabric includes: a surface layer of one part of a first fiber; a back layer of the other part of the first fiber; and the optical fiber arranged in a space of an intermediate layer between the surface layer and the back layer (FIG. 5).

The woven fabric may include: the fixing region where the optical fiber of the seventh fiber is held; and the light emitting region where the optical fiber of the seventh fiber is included to emit light. The fixing region has: a surface layer in which the first fiber, and an eighth fiber are woven; a back layer in which the first fiber, the sixth fiber, and the eighth fiber are woven; and the optical fiber arranged in a space of an intermediate layer between the surface layer and the back layer (FIGS. 11A and 11B).

The woven fabric may include: the fixing region where the optical fiber of the seventh fiber is held; and the light emitting region where the optical fiber of the seventh fiber is included to emit light. The light emitting region has: a surface layer in which the first fiber and the seventh fiber are woven; a back layer in which the first fiber, and the sixth fiber are woven; and the eighth fiber arranged in each of both layers, the surface layer and the back layer (FIGS. 9A and 9B).

The woven fabric may include a tubular body that emits an odor, and a fiber woven with the tubular body.

There is provided a lighting device including the woven fabric, an LED light source, and a controller that controls the LED light source.

There is provided a lighting device including: the woven fabric having the optical fiber; an LED light source that irradiates the woven fabric with light; a controller that controls the LED light source; and a corner portion located at a portion where the woven fabric is bent (FIG. 17B).

There is provided a lighting device including: the woven fabric having the optical fiber; an LED light source that irradiates the woven fabric with light; a controller that controls the LED light source; and a solar cell located around the LED light source (FIG. 16).

There is provided a lighting device including: the woven fabric having the optical fiber; an LED light source that irradiates the woven fabric with light; a controller that controls the LED light source; a solar cell located on a portion of the woven fabric in which light is not emitted (FIGS. 14A to 14C).

There is provided a lighting device including: the woven fabric having the optical fiber; an LED light source that irradiates the woven fabric with light; a controller that controls the LED light source; a secondary battery that provides electricity to the LED light source and the controller; a solar cell that supplies electricity to the secondary battery; and a sealing portion that seals the woven fabric, the LED light source, the controller, the secondary battery, and the solar cell (FIGS. 24A to 24C).

There is provided a curtain including: the woven fabric having the optical fiber, an LED light source that irradiates the woven fabric with light, and a controller that controls the LED light source, on one side surface of the curtain; and a solar cell, on the other side surface of the curtain (FIG. 20C).

There is provided a stairs lighting device arranged in a stair step riser portion. The stairs lighting device includes: the woven fabric having the optical fiber; an LED light source that irradiates the woven fabric with light; and a controller that controls the LED light source (FIG. 22).

There is provided a bag including: the woven fabric having the optical fiber, an LED light source that irradiates the woven fabric with light, and a controller that controls the LED light source, on one side surface of the bag; and a solar cell, on the other side surface of the bag (FIGS. 19A and 19B).

There is provided a speaker device including: a speaker; and a lighting device. The lighting device includes the woven fabric having the optical fiber, an LED light source, and a controller, and the controller turns ON the LED light source in accordance with sound emitted from the speaker (FIG. 25A).

There is provided a monitor including: a screen; and a lighting device. The lighting device includes the woven fabric having the optical fiber, an LED light source, and a controller, and the controller turn ON the LED light source in accordance with sound emitted from the screen (FIG. 25B).

It is possible to use a collar including the lighting device that winds around a neck (FIG. 24B).

It is possible to use shoes including the lighting devices arranged on side surfaces of the shoes (FIG. 24C).

It is possible to use a mobile terminal in which the lighting device is disposed on the side surface of the mobile terminal. The lighting device has a connector, is connected to the mobile terminal by the connector, and emits light by electricity of the mobile terminal (FIGS. 26A and 26B).

According to the present disclosure, it is possible to implement a complicated woven fabric with a high design quality, which has, for example, a region where optical fibers are located on the front surface of the woven fabric to emit light, and a fixing region where the optical fibers are hardly exposed on the front surface, and hidden, according to a design. It is possible to provide a method of weaving or manufacturing a woven fabric with a high light guiding property, in which bending or compression of optical fibers is reduced as much as possible.

BRIEF DESCRIPTION OF THE DRAWINGS

FIG. 10A is a perspective view of a pocket region 52c of the woven fabric 500 according to the fifth exemplary embodiment when viewed from the side surface, and FIG. 10B is a schematic view of FIG. 10A;

DETAILED DESCRIPTION OF THE INVENTION

The present disclosure will be described by the following exemplary embodiments. The following exemplary embodiments are exemplary only and do not limit the present disclosure.

First Exemplary Embodiment

Figure 1A:
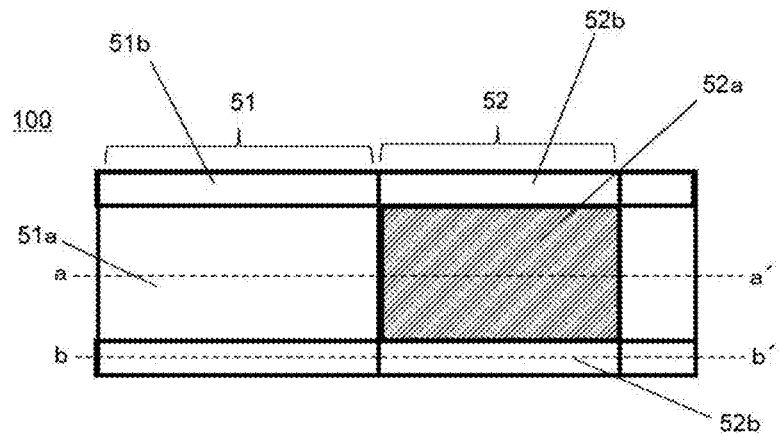
FIG. 1A is a plan view of a woven fabric 100 according to a first exemplary embodiment.
Figure 1B:
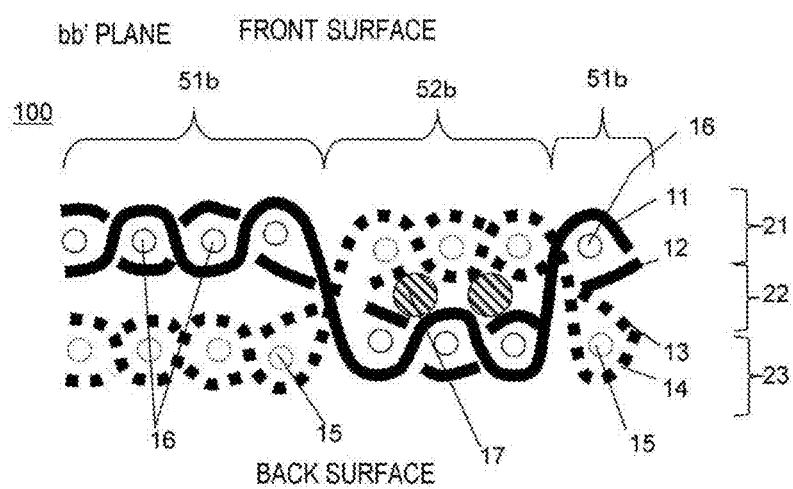
FIG. 1B is a cross-sectional view taken along the bb' portion in FIG. 1A.
Figure 1C:
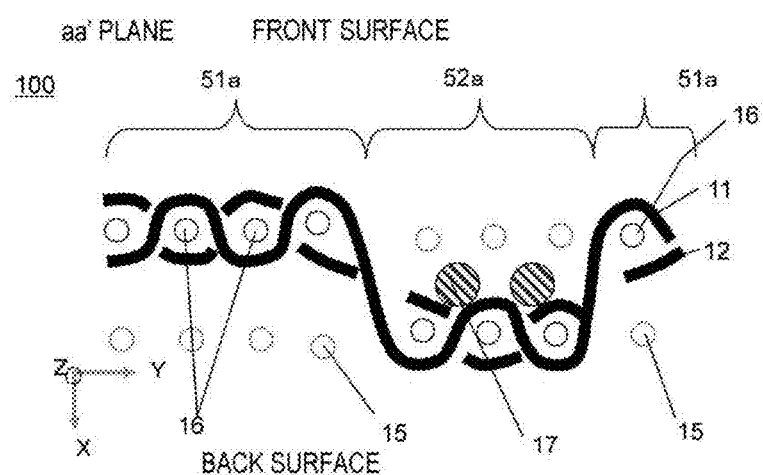
FIG. 1C is a cross-sectional view taken along the aa' portion in FIG. 1A.

FIG. 1A is a plan view of a woven fabric 100 according to a first exemplary embodiment. FIG. 1B is a cross-sectional view taken along the bb' portion in FIG. 1A. FIG. 1C is a cross-sectional view taken along the aa' portion in FIG. 1A.

<Woven Fabric 100>

In the woven fabric 100, an optical fiber region 52 and a decorative region 51 are repeated. The optical fiber region 52 is a region where a seventh fiber 17 of an optical fiber is woven. The decorative region 51 is a region where no optical fiber is present.

The optical fiber region 52 includes a fixing region 52b and a light emitting region 52a. These two regions are repeated. In the fixing region 52b, bending or compression against the seventh fiber 17 of an optical fiber is reduced, and thus the seventh fiber 17 of an optical fiber may be hidden and fixed without being exposed on the front surface in a state where a light guiding property is good.

The fixing region 52b is a region where the seventh fiber 17 is fixed.

The light emitting region 52a is a region where light is emitted from an optical fiber toward the front side surface.

The decorative region 51 includes a first decorative region 51a and a second decorative region 51b. These two regions are repeated.

The first decorative region 51a is a region adjacent to the light emitting region 52a.

The second decorative region 51b is a region adjacent to the fixing region 52b.

The woven fabric 100 is woven by a first fiber 11 to the seventh fiber 17.

<Second Decorative Region 51b>

A surface layer 21 of the second decorative region 51b is as follows.

The first fiber 11 and a second fiber 12 are located in the Y direction, and a sixth fiber 16 is located in parallel to the Z direction. The sixth fiber 16 is woven with the first fiber 11 and the second fiber 12.

A back layer 23 of the second decorative region 51b is as follows.

Likewise, a third fiber 13 and a fourth fiber 14 are located in the Y direction, and a fifth fiber 15 is located in parallel to the Z direction. The fifth fiber 15 is woven with the third fiber 13 and the fourth fiber 14.

In an intermediate layer 22, the seventh fiber 17 of an optical fiber is not present.

<Fixing Region 52b>

The surface layer 21 of the fixing region 52b is as follows.

The third fiber 13 and the fourth fiber 14 are located in the Y direction, and the fifth fiber 15 is located in parallel to the Z direction. The fifth fiber 15 is woven with the third fiber 13 and the fourth fiber 14.

The back layer 23 of the fixing region 52b is as follows.

The first fiber 11 and the second fiber 12 are located in the Y direction, and the sixth fiber 16 is located in parallel to the Z direction. The sixth fiber 16 is woven with the first fiber 11 and the second fiber 12.

In the intermediate layer 22 of the fixing region 52b, the seventh fiber 17 is located in parallel to the Z direction.

The seventh fiber 17 is an optical fiber. Other fibers are fibers other than an optical fiber. The optical fiber is interposed and fixed in a space between the surface layer 21 and the back layer 23. In this space, the optical fiber is not woven into another fiber. Thus, the optical fiber is fixed with an uninhibited linearity. The optical fiber may efficiently guide light, thereby emitting the light.

The optical fibers are held in a recessed portion between the three fifth fibers 15 and the three sixth fibers 16. In FIGS. 1B and 1C, two optical fibers are present, but three or more optical fibers may be present.

<Light Emitting Region 52a>

In the light emitting region 52a, the third fiber 13, and the fourth fiber 14 are not present, and thus the light of the optical fiber of the seventh fiber 17 is easily emitted to the outside. This light emitting region 52a may be provided as necessary.

The third fibers 13 and the fourth fibers 14 may not be eliminated, but the number (ratio) of the existing third fibers 13 and fourth fibers 14 may be reduced. It is easy to emit light from the optical fibers.

In the light emitting region 52a of FIG. 1C, either the third fibers 13 or the fourth fibers 14 may be left.

At least, it is desirable to decrease the fiber density of the surface layer in the light emitting region 52a as compared to the fiber density in the surrounding region.

Likewise, in the first decorative regions 51a as well, at the left and right sides of the light emitting region 52a, the third fibers 13 and the fourth fibers 14 are not present.

The fiber diameter of the third fiber 13 and the fourth fiber 14 may be smaller than the fiber diameter of the first fiber 11 and the second fiber 12.

<First Decorative Region 51a>

The surface layer 21 of the first decorative region 51a is the same as the surface layer 21 of the second decorative region 51b.

The back layer 23 of the first decorative region 51a is as follows.

The third fiber 13 and the fourth fiber 14 are not present, and along the Y direction, the fifth fibers 15 are located in parallel to the Z direction.

In the intermediate layer 22, the seventh fiber 17 of an optical fiber is not present.

<Seventh Fiber 17>

The seventh fiber 17 is an optical fiber. It is desirable that the optical fiber is made of a resin from the viewpoint of a weaving property. Specifically, for example, (1) an optical fiber in which a core and a clad which do not allow total reflection but are correlated with a refractive index are combined, or (2) an optical fiber in which a core material is blended with a light scattering material may be used.

That is, the above (1) is a side emission-type optical fiber using a phenomenon in which light guided inside the core is not totally reflected between the core and the clad, and leaks. Meanwhile, the above (2) is a side emission-type optical fiber that has a structure in which light is not totally reflected at an interface between a core and a clad due to blending with the scattering material, and scattered light leaks from the side surface of the optical fiber.

In such an optical fiber, it is possible to control the side surface emission luminance by adjusting the concentration of the light scattering material blended with the core material. Further, a side emission-type optical fiber having a configuration other than these may be employed. As these side emission-type optical fibers, only one type may be used, or two or more types may be used in combination.

The diameter of the optical fiber is not particularly limited, but, from the viewpoint of suitably obtaining a weaving property, for example, the diameter may be 0.01 mm or more and 2.0 mm or less, preferably may be 0.05 mm or more and 1.5 mm or less, and more preferably 0.1 mm or more and 1.0 mm or less.

It is not necessary that all the seventh fibers 17 are optical fibers. The ratio is not limited, but is generally 10% or more, preferably 10% or more and 90% or less, more preferably 20% or more and 80% or less, and most preferably 30% or more and 70% or less.

Optical fibers in following exemplary embodiments are also the same as that described above.

<First Fiber 11 to Sixth Fiber 16>

The first fiber 11 to the sixth fiber 16 are non-light guiding yarns, and yarns not having a light guiding property unlike the optical fiber. Materials constituting the first fiber 11 to the sixth fiber 16 are not limited, and the first fiber 11 to the sixth fiber 16 may be natural fibers or synthetic fibers. In the case of a synthetic fiber, as the constituent resins, a polyamide-based resin such as nylon 6 and nylon 66, a polyester-based resin such as polyethyleneterephthalate, polybutyleneterephthalate, and polytrimethyleneterephthalate, a polyolefin-based resin such as polypropylene, and a polyacryl-based resin may be exemplified. As these, only one type may be used, or two or more types may be used in combination.

The fiber diameter (fineness) of the first fiber 11 to the sixth fiber 16 is not particularly limited, but may be, for example, 10 dtex or more and 5,000 dtex or less, preferably 20 dtex or more and 4,000 dtex or less, and more preferably 30 dtex or more and 3,000 dtex or less.

Each of the first fiber 11 to the sixth fiber 16 may not include a light transmission inhibiting component, or may include a light transmission inhibiting component. When each of the third fiber 13, the fourth fiber 14, and the fifth fiber 15 includes a light transmission inhibiting component, it is possible to improve the light shielding property against the optical fiber.

The light transmission inhibiting component only has to be a component capable of inhibiting light transmission, and may inhibit light transmission by, for example, reflection•dispersion, light absorption, or other actions. Specifically, for example, a colorant (e.g., a pigment or a dye), a light absorbent, and an extender (e.g., various fillers) may be exemplified. As these, only one type may be used, or two or more types may be used in combination. Among them, for example, as the pigment, an organic pigment such as azo-based, phthalocyanine-based, perinone-based, perylene-based, and anthraquinone-based pigments, and an inorganic pigment such as carbon black, ultramarine, red iron oxide, titanium oxide, and iron oxide may be exemplified. As these, only one type may be used, or two or more types may be used in combination. As the dye, a dye such as anthraquinone-based, perinone-based, perylene-based, azo-based, methine-based, and quinoline-based dyes may be exemplified. Among them, a dye in darker color is desirable, and a black-based dye is particularly desirable. As these, only one type may be used, or two or more types may be used in combination.

<Effect>

In the light emitting region 52a, light is emitted, and in the fixing region 52b, optical fibers may be securely held without being bent. The woven fabric may stably and efficiently emit light.

Second Exemplary Embodiment

Figure 2A:
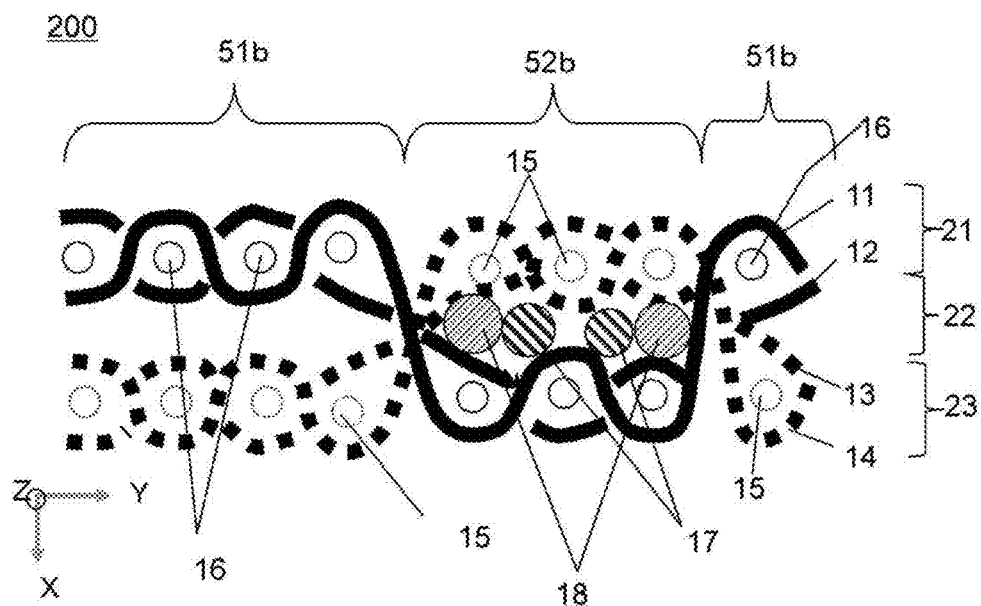
FIGS. 2A and 2B are cross-sectional views of a woven fabric 200 according to a second exemplary embodiment.
Figure 2B:
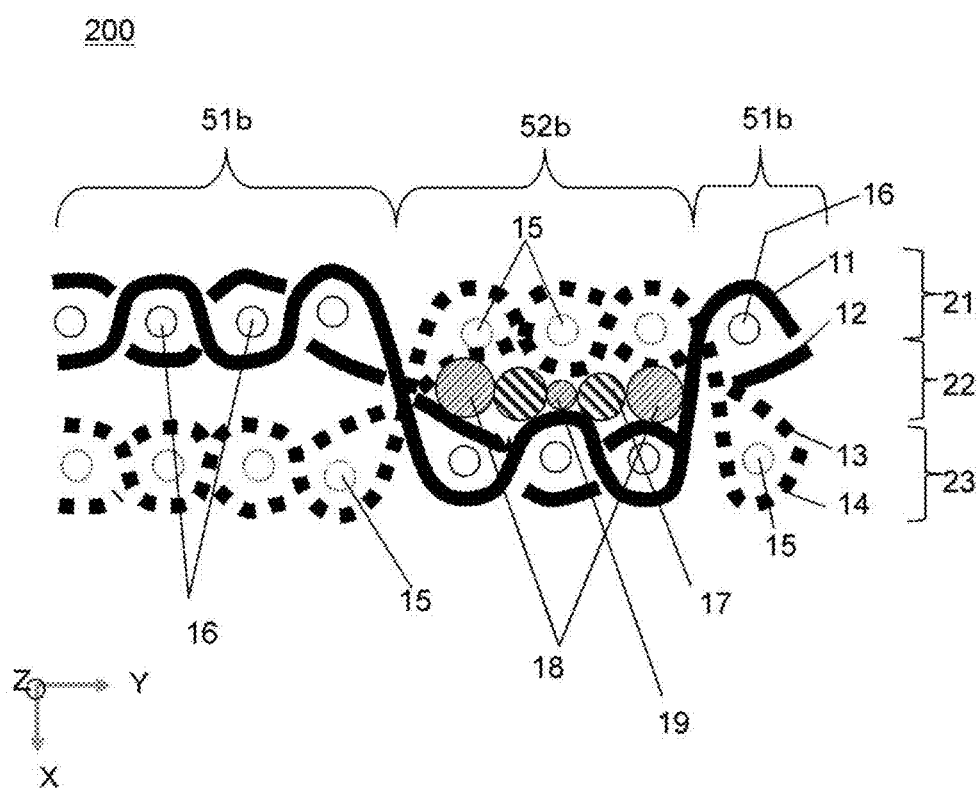

FIGS. 2A and 2B are cross-sectional views of a woven fabric 200 according to a second exemplary embodiment. The second exemplary embodiment is different from the first exemplary embodiment in that an eighth fiber 18 is included. The eighth fiber 18 is a fiber other than an optical fiber like the first fiber 11 to the sixth fiber 16. Items not described are the same as those in the first exemplary embodiment. Regions illustrated in FIGS. 2A and 2B correspond to regions of FIGS. 1B and 1C, respectively. Items not described are the same as those in the first exemplary embodiment.

The seventh fiber 17 (the optical fiber) is interposed and fixed in the intermediate layer 22 in a space between the surface layer 21 and the back layer 23. In this space in the intermediate layer 22, the eighth fiber 18 is also located. Each of the seventh fiber 17 and the eighth fiber 18 is not woven into another fiber. Thus, the seventh fiber 17 (the optical fiber) is fixed with an uninhibited linearity. The seventh fiber 17 (the optical fiber) is not bent, and thus may efficiently emit light. The eighth fiber 18 also has a role of protecting the seventh fiber 17 (the optical fiber). Pressures from fibers in the surface layer 21 and the back layer 23 are alleviated. The eighth fibers 18 are arranged at both sides of the optical fibers as the seventh fibers 17.

Each of the seventh fiber 17 and the eighth fiber 18 may be partially woven with another fiber. In this case, the seventh fiber 17 and the eighth fiber 18 are fixed to some extent.

In FIG. 2B, a ninth fiber 19 as a non-optical fiber is also arranged between the optical fibers as the seventh fibers 17.

<Fiber Diameter>

It is desirable that the fiber diameter of the eighth fiber 18 is equal to or larger than the fiber diameter of the seventh fiber 17 (the optical fiber) so that the eighth fiber 18 may protect the seventh fiber 17 (the optical fiber).

It is desirable that the fiber diameter of the ninth fiber 19 is equal to or smaller than the fiber diameter of the seventh fiber 17 (the optical fiber) so that the ninth fiber 19 may eliminate play at the position of the seventh fiber 17 (the optical fiber).

<Effect>

In addition to the effect of the first exemplary embodiment, optical fibers may be securely held.

As in the first exemplary embodiment, in the light emitting region 52a, light is emitted, and in the fixing region 52b, the optical fibers are securely held. The woven fabric may stably emit light. In the second exemplary embodiment, it is possible to more securely protect the optical fibers.

Third Exemplary Embodiment

Figure 3A:
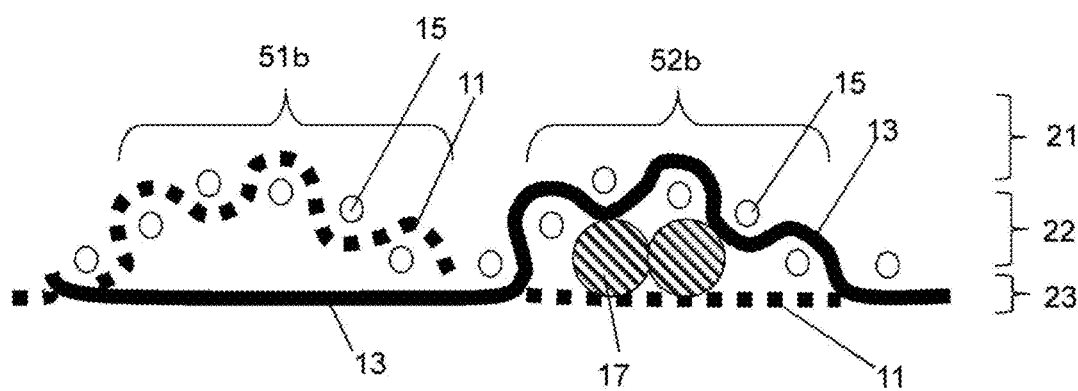
FIGS. 3A and 3B are cross-sectional views of a woven fabric 300 according to a third exemplary embodiment.
Figure 3B:
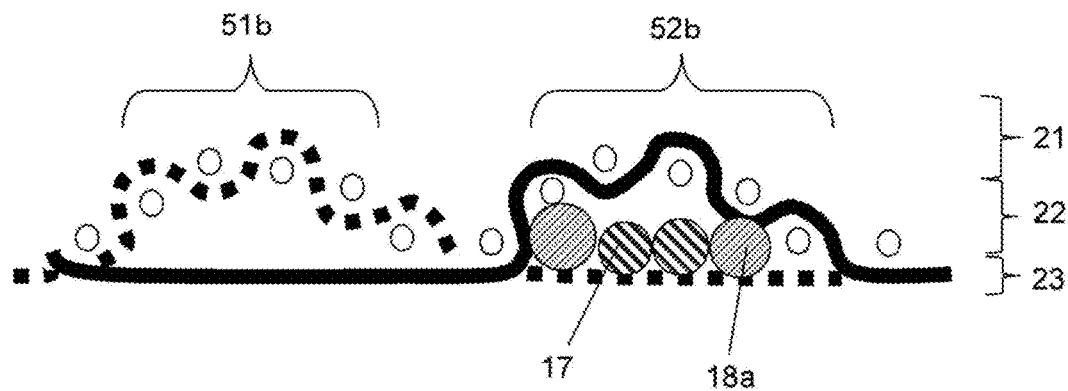

FIGS. 3A and 3B are cross-sectional views of a woven fabric 300 according to a third exemplary embodiment. The third exemplary embodiment is different from the first and second exemplary embodiments in that a small number of fibers are used except for the seventh fibers 17 (the optical fibers). Items not described are the same as those in the first and second exemplary embodiments.

FIGS. 3A and 3B illustrate regions corresponding to the fixing region 52b and the second decorative region 51b of the first exemplary embodiment.

In the fixing region 52b, the fifth fiber 15 and the third fiber 13 are woven, and the first fiber 11 is not woven. In a region of the intermediate layer 22 between the surface layer 21 in which the fifth fiber 15 and the third fiber 13 are woven, and the first fiber 11 (the back layer 23), the optical fiber of the seventh fiber 17 is arranged. The region of the intermediate layer 22 may be linearly connected, thereby securing straightness of the optical fiber of the seventh fiber 17. As a result, it is possible to fix the optical fiber in a state where the light emission efficiency of the optical fiber of the seventh fiber 17 is good.

In the second decorative region 51b, the fifth fiber 15 and the first fiber 11 are woven, and the third fiber 13 is not woven. In a region of the intermediate layer 22 between the surface layer 21 in which the fifth fiber 15 and the first fiber 11 are woven, and the third fiber 13 (the back layer 23), the optical fiber of the seventh fiber 17 is not arranged.

In FIG. 3B, an eighth fiber 18a is also present. As in FIGS. 2A and 2B, the eighth fiber 18a is arranged adjacent to the optical fiber of the seventh fiber 17 in order to protect the optical fiber of the seventh fiber 17. The relationship between the optical fiber of the seventh fiber 17 and the eighth fiber 18a is the same as that in the above described second exemplary embodiment. The ninth fiber 19 in FIG. 2B may be similarly used.

<Effect>

As in the first and second exemplary embodiments, in the light emitting region 52a, light is emitted, and in the fixing region 52b, the optical fibers are securely held. The woven fabric may stably emit light. In the third exemplary embodiment, this effect occurs even with a small number of fibers.

Fourth Exemplary Embodiment

Figure 4:
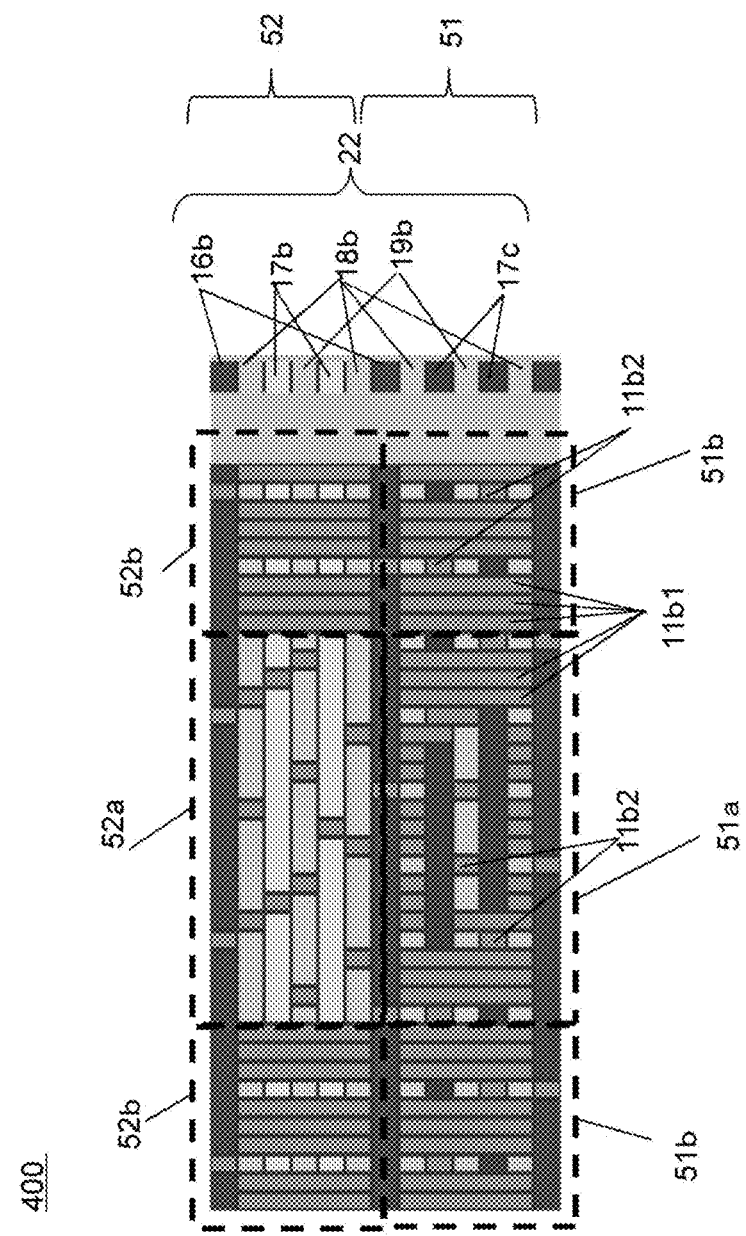
FIG. 4 is a schematic plan view of a woven fabric 400 according to a fourth exemplary embodiment.
Figure 5:
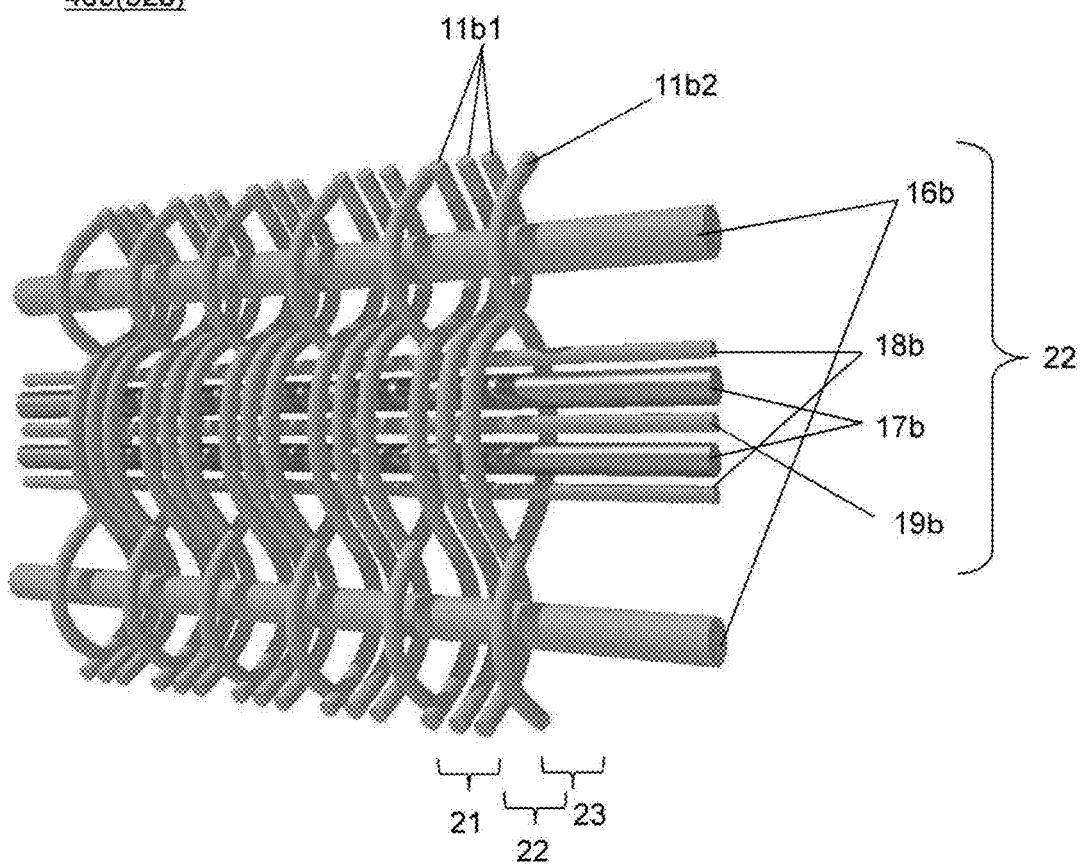
FIG. 5 is a perspective view of the woven fabric 400 according to the fourth exemplary embodiment.

FIGS. 4 and 5 are a schematic plan view and a perspective view of a woven fabric 400 according to a fourth exemplary embodiment, respectively. The fourth exemplary embodiment is different from the first to third exemplary embodiments in the way in which a seventh fiber 17b (an optical fiber) is woven, and the way in which an eighth fiber 18b and a ninth fiber 19b in the vicinity of the seventh fiber 17b (the optical fiber) are woven. There is a region not having the seventh fiber 17b (the optical fiber). Items not described are the same as those in the first to third exemplary embodiments.

<Overall Region>

In the vertical direction of FIG. 4, there are the optical fiber region 52 having the optical fiber (the seventh fiber 17b), and the decorative region 51 as a region for decorativeness, which does not have the optical fiber (the seventh fiber 17b).

The optical fiber region 52 is a region where light is emitted from the optical fiber (the seventh fiber 17b). In this region, the seventh fiber 17b (the optical fiber), a sixth fiber 16b, the eighth fiber 18b, and the ninth fiber 19b are woven with a first fiber 11b1 and a first fiber 11b2. Repetition is made at a ratio of three first fibers 11b1 to one first fiber 11b2.

The decorative region 51 does not have the optical fiber (the seventh fiber 17b), but has a seventh fiber 17c as a bright fiber, and thus is a naturally prominent region.

In this region, the seventh fiber 17c, the sixth fiber 16b, the eighth fiber 18b, and the ninth fiber 19b are woven with the first fiber 11b1 and the first fiber 11b2.

In the thickness direction (front-back direction), the intermediate layer 22, the back layer 23, and the surface layer 21 are present.

There are the fixing region 52b, the light emitting region 52a, the first decorative region 51a, and the second decorative region 51b, which are partitioned.

The light emitting region 52a is a portion where the seventh fibers 17b (the optical fibers) largely appear on the front surface, and emit light.

The fixing region 52b is a region where the optical fibers (the seventh fibers 17b) are held without largely appearing on the front surface. The fixing region 52b is located at each of both ends of the light emitting region 52a. In a portion of the light emitting region 52a, the seventh fibers 17b (the optical fibers) excessively appear on the front surface and thus are unstable, whereas in the fixing region 52b, the bending or compression of the optical fibers (the seventh fibers 17b) is reduced, and the optical fibers are securely pressed and held while a light guiding property is maintained.

Accordingly, it is possible to implement a complicated woven fabric having a region in which the optical fibers are exposed on the front surface and a region in which the optical fibers are hidden, and thus to exhibit a design property.

The first decorative region 51a, as a region contrasted with the light emitting region 52a, is a region where light is not emitted, but a vivid color is prominent.

The second decorative region 51b, as a region contrasted with the fixing region 52b, is a dark color region where light is not emitted. Light and shade may be added.

FIG. 4 is a schematic plan view of the woven fabric 400, from which it is possible to see fibers appearing on the front surface.

FIG. 5 is a perspective view of the fixing region 52b. Similarly, in the adjacent light emitting region 52a as well, the first fibers 11b1 and 11b2 go and come between the surface layer 21 and the back layer 23. In the intermediate layer 22, the seventh fibers 17b (the optical fibers), the sixth fibers 16b, the eighth fibers 18b, and the ninth fiber 19b are located. The intermediate layer 22 is interposed between the first fibers 11b1 and the first fibers 11b2.

The difference between the fixing region 52b and the light emitting region 52a is a ratio of the first fibers 11b present in the surface layer 21. In the fixing region 52b, the ratio of the first fibers 11b present in the surface layer 21 is higher than that in the light emitting region 52a.

In the optical fiber region 52 and the decorative region 51, the seventh fiber 17b (the optical fiber) and the seventh fiber 17c (the non-optical fiber) are different from each other.

<Type of Fiber>

The seventh fiber 17b is an optical fiber. Others are fibers other than an optical fiber.

The sixth fiber 16b to the ninth fiber 19b, the seventh fiber 17b (the optical fiber), and the seventh fiber 17c are wefts. The first fibers 11b1 and 11b2 are warps.

As can be seen from FIG. 5, in the fixing region 52b, in the intermediate layer 22 between the sixth fibers 16b, the seventh fibers 17b (the optical fibers), the eighth fibers 18b, and the ninth fiber 19b are present.

<Intermediate Layer 22>

In the intermediate layer 22 of the fixing region 52b, in the intermediate layer 22 between the sixth fibers 16b, two seventh fibers 17b (the optical fibers), two eighth fibers 18b, and one ninth fiber 19b are alternately aligned. Meanwhile, the eighth fiber 18b and the ninth fiber 19b protect the seventh fiber 17b (the optical fiber) but are not essential. However, it is desirable that the eighth fiber 18b and the ninth fiber 19b are present.

The intermediate layer 22 of the second decorative region 51b also has a similar structure, but the seventh fiber 17b (the optical fiber) and the seventh fiber 17c are changed.

<Light Emitting Region 52a>

The seventh fiber 17b (the optical fiber) as a weft is woven with the first fibers 11b (11b1+11b2) as warps. One first fiber 11b1 is arranged at the front side of the seventh fiber 17b (the optical fiber), and eleven first fibers 11b (11b1+11b2) are arranged at the rear side of the seventh fiber 17b (the optical fiber). This cycle is repeated. In this region, more seventh fibers 17b (the optical fibers) are exposed on the front surface. The number is not limited to eleven, but may range from nine to fifteen.

In the eighth fiber 18b and the ninth fiber 19b as wefts, one first fiber 11b1 is arranged at the front side of the eighth fiber 18b and the ninth fiber 19b, and five first fibers 11b (11b1+11b2) are arranged at the rear side of the eighth fiber 18b and the ninth fiber 19b. This cycle is repeated. The number is not limited to five. In this region, it is desirable that the number of eighth fibers 18b and ninth fibers 19b, which are externally exposed, is smaller than the number of seventh fibers 17b (the optical fibers) appearing on the front surface. Thus, the eighth fiber 18b and the ninth fiber 19b are less prominent than the seventh fiber 17b (the optical fiber).

The sixth fiber 16b as a weft is woven with the first fibers 11b1 and 11b2 as warps. Eleven first fibers 11b (11b1+11b2) are arranged at the rear side of the sixth fiber 16b, and one first fiber 11b2 is arranged at the front side of the sixth fiber 16b. This cycle is repeated.

A cycle of two seventh fibers 17b (the optical fibers), a cycle of two eighth fibers 18b, and a cycle of one ninth fiber 19b are shifted from each other in a phase. This is a structure where it is possible to homogeneously hold the seventh fibers 17b (the optical fibers) as a whole (i.e., the homogeneity of light emission).

<First Decorative Region 51a>

This structure is the same as the structure of the light emitting region 52a, but the seventh fiber 17b (the optical fiber) is changed into the seventh fiber 17c.

The seventh fiber 17c as a weft is woven with the first fibers 11b1 and 11b2 as warps. The first fibers 11b1 and 11b2 (four and five) are arranged at the front side of the seventh fiber 17c, and the first fibers 11b1 and 11b2 (one and eleven) are arranged at the rear side of the seventh fiber 17c. This cycle is repeated. Like the seventh fiber 17b (the optical fiber) of the light emitting region 52a, the number may not be eleven but may range from nine to fifteen.

In the eighth fiber 18b as a weft, one first fiber 11b2 is arranged at the rear side of the eighth fiber 18b, and three first fibers 11b1 are arranged at the front side of the eighth fiber 18b. This cycle is repeated.

In the ninth fiber 19b as a weft, seven first fibers 11b1 in total are arranged at the front side of the ninth fiber 19b, and three first fibers 11b2 in total are arranged at the front side of the ninth fiber 19b. As illustrated in FIG. 4, between portions of two seventh fibers 17c arranged at the front side of eleven first fibers 11b1 and 11b2, one first fiber 11b2 is arranged at the front side of the ninth fiber 19b, and three first fibers 11b1 are arranged at the rear side of the ninth fiber 19b. This cycle is repeated. In other portions, three first fibers 11b1 are arranged at the front side of the ninth fiber 19b, and one first fiber 11b2 is arranged at the rear side of the ninth fiber 19b. This cycle is repeated.

The sixth fiber 16b as a weft is woven with the first fibers 11b1 and 11b2 as warps. Eleven first fibers 11b1 and 11b2 are arranged at the rear side of the sixth fiber 16b, and one first fiber 11b2 is arranged at the front side of the sixth fiber 16b. This cycle is repeated.

Two seventh fibers 17c are shifted from each other in a cycle and a phase.

<Fixing Region 52b>

The seventh fiber 17b (the optical fiber) as a weft is woven with the first fibers 11b1 and 11b2 as warps. Three first fibers 11b1 are arranged at the front side of the seventh fiber 17b (the optical fiber), and one first fiber 11b2 is arranged at the rear side of the seventh fiber 17b (the optical fiber). This cycle is repeated.

This also applies to the eighth fiber 18b and the ninth fiber 19b as wefts. A cycle of three fibers and one fiber is exemplary, and another cycle may be employed. Three to five fibers are desirable. Three fiber are particularly good.

The eighth fiber 18b, the seventh fiber 17b (the optical fiber), and the ninth fiber 19b have the same cycle, and are matched in a line shape in the vertical direction in FIG. 4.

According to this line, the seventh fiber 17b (the optical fiber) is gently held as a whole.

The sixth fiber 16b as a weft is woven with the first fibers 11b1 and 11b2, as warps. Eleven first fibers 11b1 and 11b2 are arranged at the rear side of the sixth fiber 16b, and one first fiber 11b2 is arranged at the front side of the sixth fiber 16b. This cycle is repeated.

In this fixing region 52b, the seventh fiber 17 (the optical fiber) is fixed inside without being excessively exposed on the front surface. The optical fiber (the seventh fiber 17b) may not be excessively bent but may be securely held.

<Second Decorative Region 51b>

The seventh fiber 17c as a weft is woven with the first fibers 11b1 and 11b2 as warps. Seven first fibers 11b1 are arranged at the front side of the seventh fiber 17c, and one first fiber 11b2 is arranged at the rear side of the seventh fiber 17c. This cycle is repeated.

In the eighth fiber 18b as a weft, three first fibers 11b1 are arranged at the front side of the eighth fiber 18b, and one first fiber 11b2 is arranged at the rear side of the eighth fiber 18b. This cycle is repeated.

In the ninth fiber 19b as a weft, three first fibers 11b1 are arranged at the front side of the ninth fiber 19b, and one first fiber 11b2 is arranged at the rear side of the ninth fiber 19b. This cycle is repeated.

The sixth fiber 16b as a weft is woven with the first fibers 11b1 and 11b2 as warps. Eleven first fibers 11b1 and 11b2 are arranged at the rear side of the sixth fiber 16b, and one first fiber 11b2 is arranged at the front side of the sixth fiber 16b. This cycle is repeated.

Two seventh fibers 17c are shifted from each other in a cycle and a phase.

<Overall Region>

A way of weaving the sixth fiber 16b is unchanged in both the decorative region 51 and the optical fiber region 52.

A way of weaving the seventh fiber 17b (the optical fiber), the eighth fiber 18b, the ninth fiber 19b, and the seventh fiber 17c is different between the decorative region 51 and the optical fiber region 52.

<Diameter>

The sixth fiber 16b has a diameter larger than the seventh fiber 17b (the optical fiber), the eighth fiber 18b, and the ninth fiber 19b. The sixth fiber 16b secures the overall strength of the woven fabric 400.

<Seventh Fiber 17b, Eighth Fiber 18b, and Ninth Fiber 19b>

The seventh fiber 17b (the optical fiber) and the eighth fiber 18b are the same as the seventh fiber 17, the eighth fiber 18, and the ninth fiber 19 in FIGS. 2A and 2B. That is, the eighth fiber 18b may not be present. As in FIG. 2A, an arrangement in which two seventh fibers 17b (the optical fibers) are interposed between two eighth fibers 18b may be employed. An arrangement as in FIG. 2B may be employed. Diameters of the seventh fiber 17b (the optical fiber) and the eighth fiber 18b are also the same as diameters of the seventh fiber 17 and the eighth fiber 18.

As can be seen from FIG. 5, two thick sixth fibers 16b form the entire skeleton, thereby securing the strength.

<Optical Fiber Region 52 and Decorative Region 51>

A distribution of bright portions is similar between the optical fiber region 52 having the optical fiber (the seventh fiber 17b), and the decorative region 51 not having the optical fiber, as a region for decorativeness. That is, there is the first decorative region 51a facing the light emitting region 52a. The light emitting region 52a is bright by the optical fiber (the seventh fiber 17b). Meanwhile, the first decorative region 51a is bright by the seventh fiber 17c. At night, due to lighting of the optical fiber (the seventh fiber 17b), the light emitting region 52a is brightly prominent, and in the daytime, the first decorative region 51a is prominent. In both regions, arrays of the optical fiber (the seventh fiber 17b) and the seventh fiber 17c are similar to each other.

<Effect>

As in the first exemplary embodiment, in the light emitting region 52a, light is emitted, and in the fixing region 52b, optical fibers (the seventh fibers 17b) are securely held. The woven fabric may stably emit light.

In the fourth exemplary embodiment, in the light emitting region 52a and the first decorative region 51a, the seventh fiber 17b (the optical fiber) and the seventh fiber 17c are contrastively arranged. Since respective cycles of the plurality of seventh fibers 17b (the optical fibers), and the plurality of seventh fibers 17c are different, the decorativeness is high.

In the above structure, the seventh fiber 17b (the optical fiber) is protected without being exposed on the back surface. The seventh fiber 17b (the optical fiber) is not excessively bent, and thus is not damaged. Then, the light radiation efficiency is high.

Fifth Exemplary Embodiment

Figure 6:
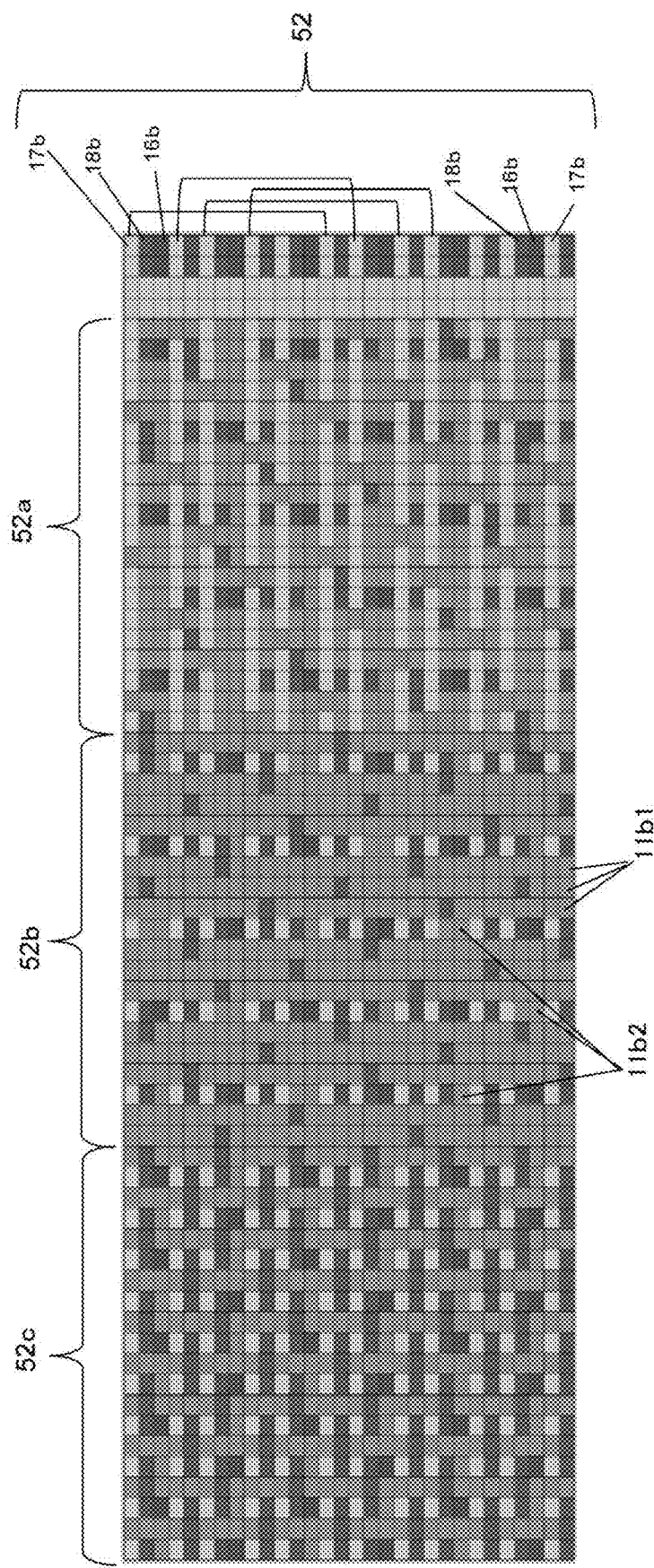
FIG. 6 is a schematic plan view of a woven fabric 500 according to a fifth exemplary embodiment.
Figure 7:
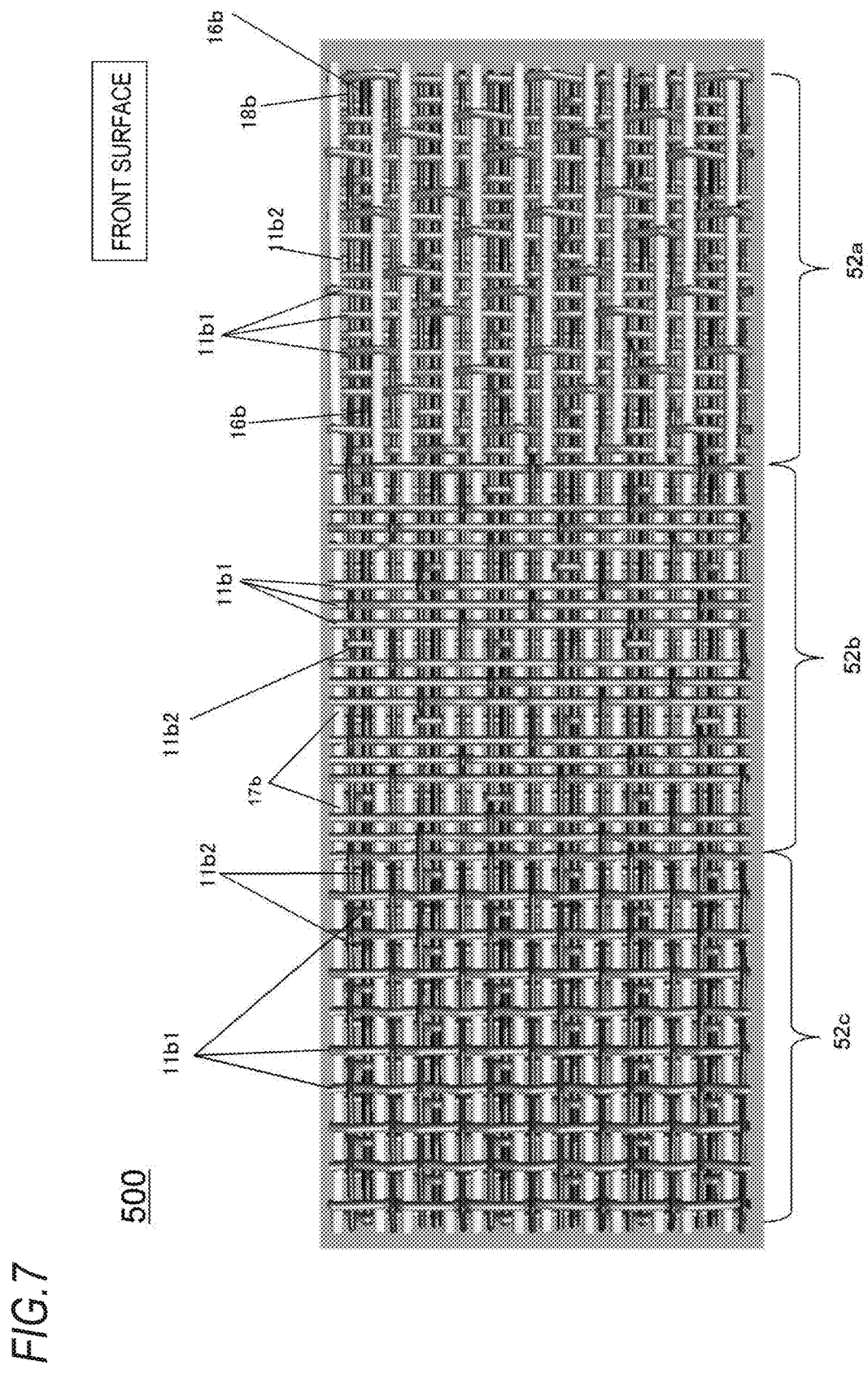
FIG. 7 is a three-dimensional plan view of a front surface of the woven fabric 500 according to the fifth exemplary embodiment.
Figure 8:
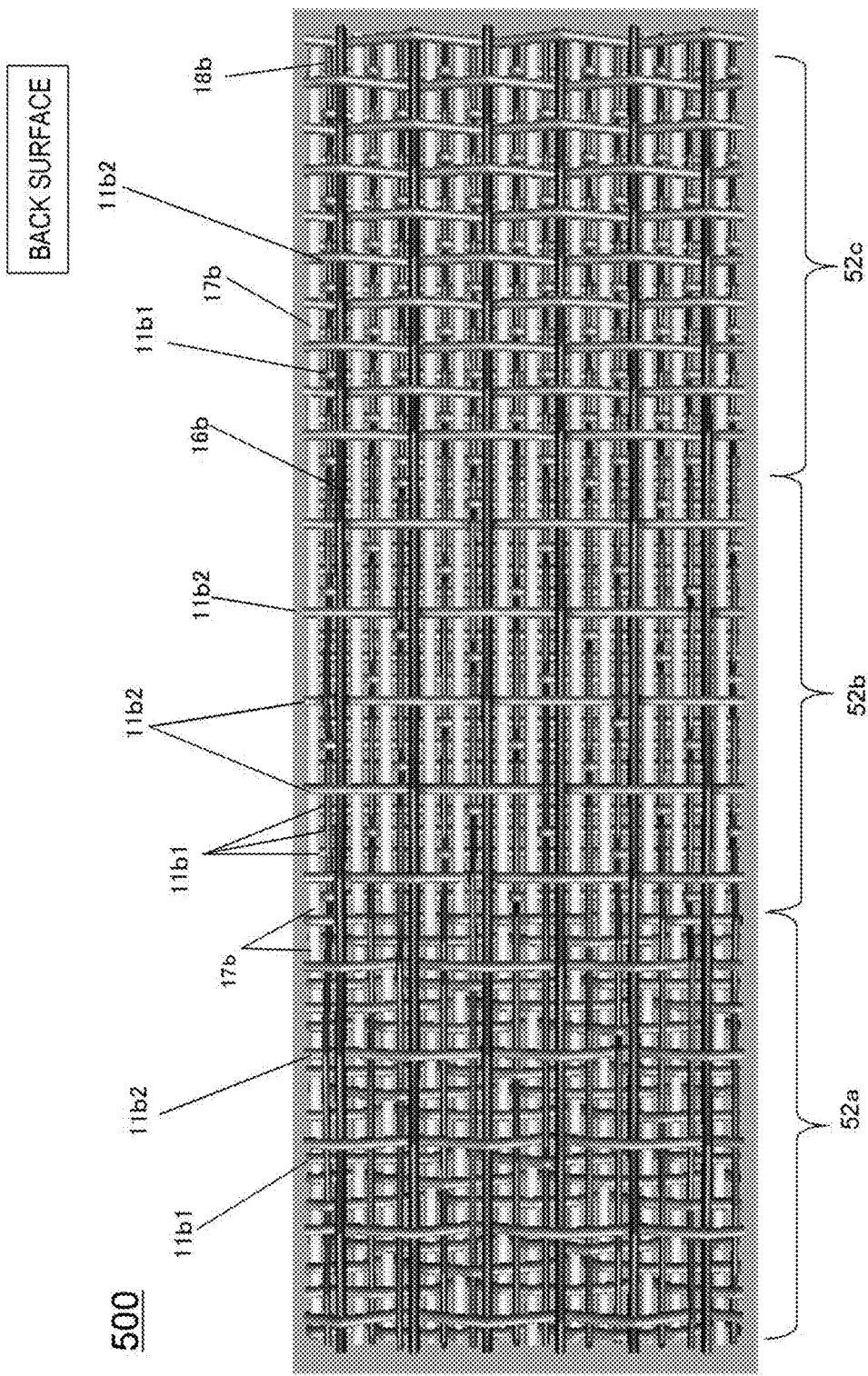
FIG. 8 is a three-dimensional plan view of a back surface of the woven fabric 500 according to the fifth exemplary embodiment.

FIG. 6 is a schematic plan view of a woven fabric 500 according to a fifth exemplary embodiment. FIGS. 7 and 8 are three-dimensional plan views of the woven fabric 500 according to the fifth exemplary embodiment, and illustrate the front surface and the back surface, respectively. The woven fabric 500 has the light emitting region 52a, the fixing region 52b, and a pocket region 52c. Items not described are the same as those in the above exemplary embodiments.

The woven fabric 500 includes only the optical fiber region 52 as a region having the optical fiber (the seventh fiber 17b), but may include the decorative region 51 like the woven fabric 400 in the fourth exemplary embodiment.

The light emitting region 52a is a region where light is emitted.

The fixing region 52b is a region where the optical fiber (the seventh fiber 17b) is fixed and the optical fiber is hidden from the front surface. In this region, the optical fiber (the seventh fiber 17b) is stably fixed inside the woven fabric 500 so as not to bend and not to be damaged.

The pocket region 52c is a bag-shaped region that covers the optical fibers (the seventh fibers 17b) with sheets of fibers in the back layer and the surface layer. This is a region that couples the optical fibers (the seventh fibers 17b) to, for example, a light source such as an LED.

<Type of Fiber>

The seventh fiber 17b is an optical fiber. Other fibers are fibers other than an optical fiber.

The sixth fiber 16b, the eighth fiber 18b, and the seventh fiber 17b (the optical fiber) are wefts. The first fiber 11b1 and the first fiber 11b2 are warps.

Only the first fiber 11b1 and the first fiber 11b2 are warps.

Wefts are repeated in the order of the sixth fiber 16b, the eighth fiber 18b, the seventh fiber 17b (the optical fiber), the eighth fiber 18b, the seventh fiber 17b (the optical fiber), and the sixth fiber 16b. Between two sixth fibers 16b, two eighth fibers 18b and two seventh fibers 17b (the optical fibers) are located, respectively.

<Light Emitting Region 52a>

The light emitting region 52a is a region where the optical fibers (the seventh fibers 17b) are largely exposed on the front surface.

In FIG. 6, assuming that one rectangle is a square unit, in the cycle, the seventh fiber 17b (the optical fiber) is externally exposed by five square units or six square units, and is exposed by one square unit on the rear side of the first fiber 11b1.

The number of square units by which the seventh fiber 17b (the optical fiber) is externally exposed may range from five to twelve.

Figure 9B:
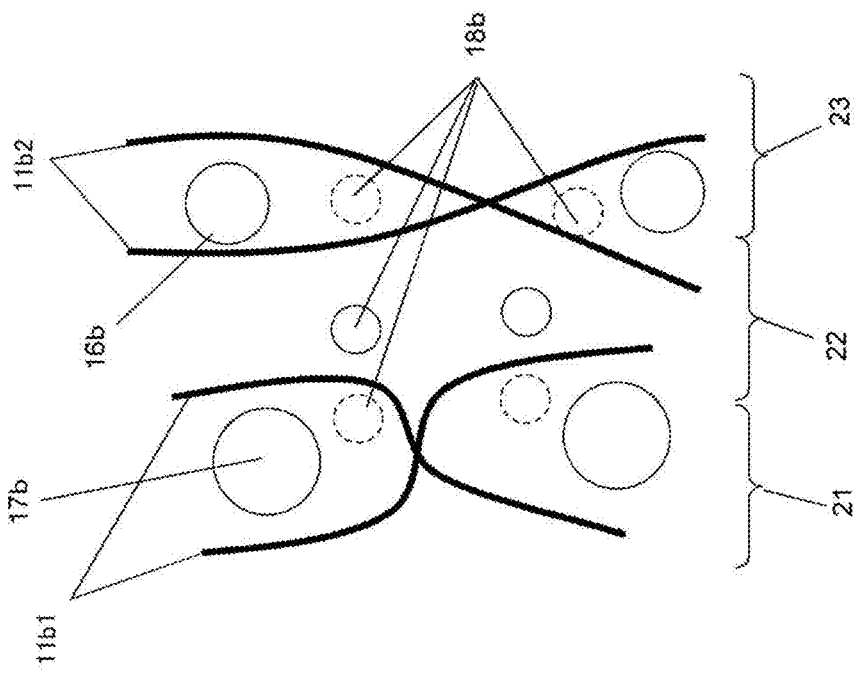
FIG. 9B is a schematic view of FIG. 9A.
Figure 9A:
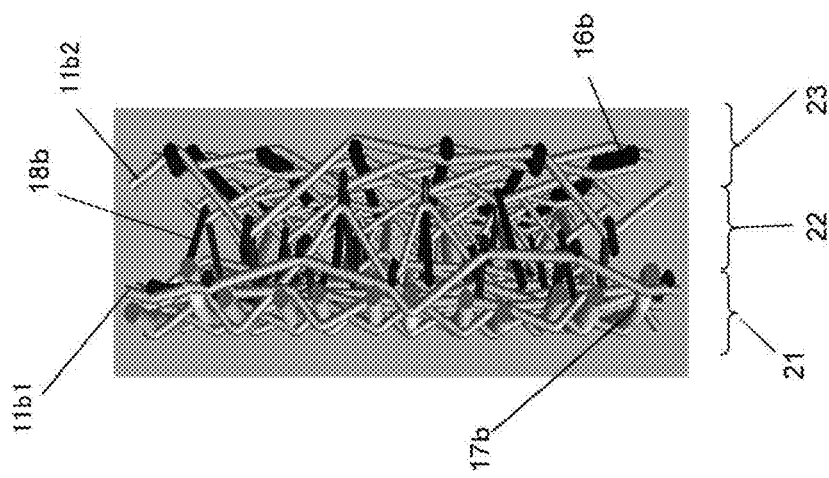
FIG. 9A is a perspective view of a side surface in a light emitting region 52a of the woven fabric 500 according to the fifth exemplary embodiment.

FIG. 9A illustrates a perspective view of the side surface of the light emitting region 52a. FIG. 9B illustrates a schematic cross-sectional view of the light emitting region 52a.

There are the surface layer 21, the intermediate layer 22, and the back layer 23.

The seventh fibers 17b (the optical fibers) are located in the surface layer 21 to emit light.

The sixth fibers 16b are located in the back layer 23, and balanced. This secures the strength of the woven fabric 500.

The first fiber 11b includes the first fiber 11b1 at the surface layer side, and the first fiber 11b2 at the back layer side.

The eighth fibers 18b are mainly located in the intermediate layer 22, but are partially located in the surface layer 21 and the back layer 23 and coupled to the surface layer 21 and the back layer 23. Thus, the eighth fibers 18b go and come between both side positions indicated by a solid line and a broken line.

The fibers in descending order of fiber diameter are the seventh fiber 17b (the optical fiber), the sixth fiber 16b, and the eighth fiber 18b.

The sixth fiber 16b is thick, and thus secures the strength of the woven fabric 500. The eighth fiber 18b is thinner than the sixth fiber 16b, and connects the respective layers.

<Pocket Region 52c>

FIG. 10A illustrates a perspective view of the side surface of the pocket region 52c. FIG. 10B illustrates a schematic cross-sectional view of the pocket region 52c.

The optical fibers of the seventh fibers 17b are not exposed on both the front surface and the back surface while located in the intermediate layer 22.

The back layer 23 is constituted by the sixth fibers 16b and the first fibers 11b1 and 11b2.

The surface layer 21 is constituted by the eighth fibers 18b and the first fibers 11b1.

There are layers at the front and rear sides of the optical fibers of the seventh fibers 17b, which may protect the seventh fibers 17b (the optical fibers) from the viewpoint of manufacturing and working. The optical fibers (the seventh fibers 17b) are not woven with other fibers and thus are easily connected to a light source such as an LED.

<Fixing Region 52b>

Figure 11B:
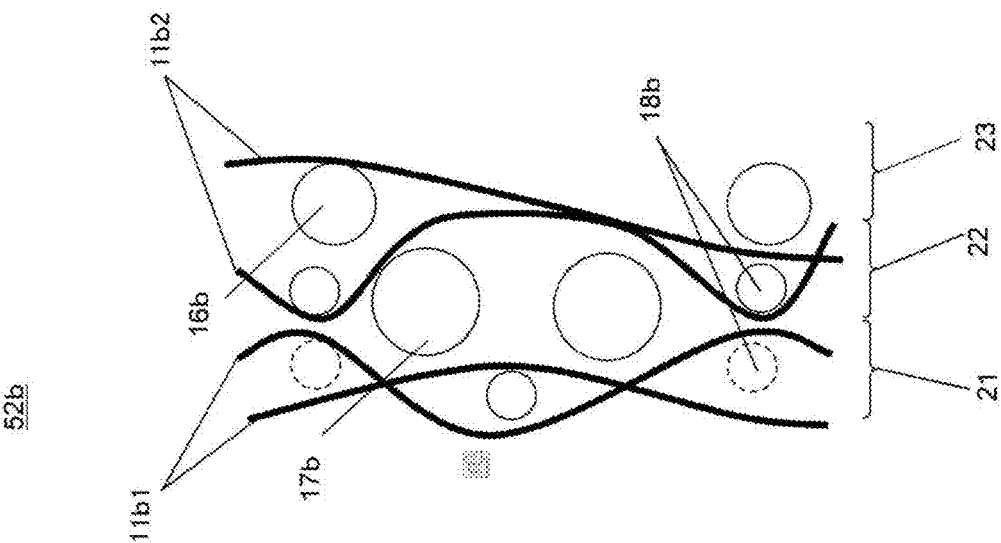
FIG. 11B is a schematic view of FIG. 11A.
Figure 11A:
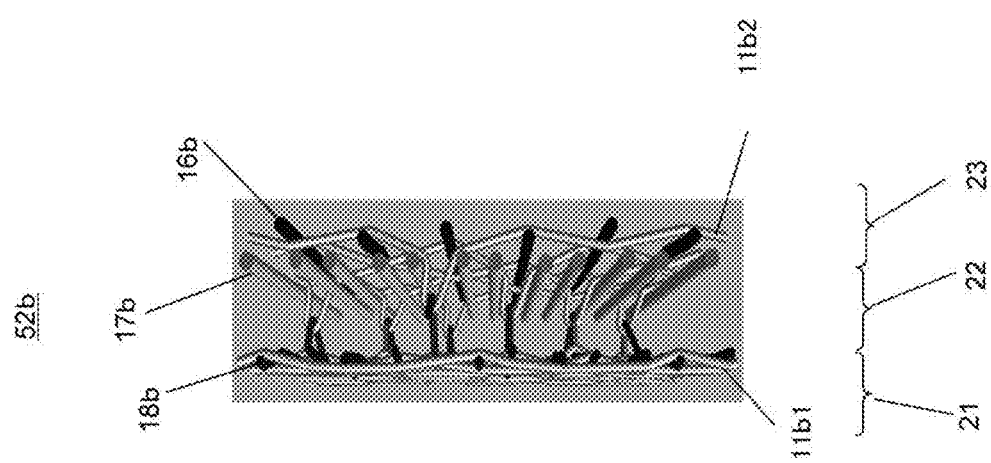
FIG. 11A is a perspective view of a fixing region 52b of the woven fabric 500 according to the fifth exemplary embodiment when viewed from the side surface.

FIG. 11A illustrates a perspective view of a side surface of the fixing region 52b. FIG. 11B illustrates a schematic cross-sectional view of the fixing region 52b.

The seventh fibers 17b (the optical fibers) are located in the intermediate layer 22. The sixth fibers 16b are located in the back layer 23. The eighth fibers 18b are located in both the intermediate layer 22 and the surface layer 21, and thus couples the surface layer 21 to the back layer 23. The first fiber 11b includes the first fiber 11b1 at the surface layer side and the first fiber 11b2 at the back layer side.

As can be seen from FIGS. 6, 7, and 8, with respect to the seventh fiber 17b (the optical fiber), the first fiber 11b1 is located by three square units at the front side, and the first fiber 11b2 is located by one square unit at the rear side. This is repeated. When the number of square units is smaller than three, the optical fiber (the seventh fiber 17b) is easily bent, so that a light emission rate increases in the corresponding portion, and thus a light guiding property becomes poor, and a damage is also easily caused. Three or more square units are desirable. When the number of square units is larger than five, a holding property of the optical fiber (the seventh fiber 17b) is lowered. Three square units to five square units are desirable. Particularly, three square units are good. By this one square unit (the portion of the first fiber 11b2), the first fiber 11b2 is located in the back layer 23.

Therefore, the eighth fiber 18b appears on the front and rear sides and goes and comes between the surface layer 21 and the back layer 23.

The sixth fiber 16b alternately appears on the front and rear sides and is located in the back layer 23.

The seventh fiber 17b externally appears and is located in the intermediate layer 22.

This portion (a portion where the sixth fiber 16b and the seventh fiber 17b appear on the front surface) forms a line shape in the vertical direction of FIG. 6. According to this line, the bending or compression of the optical fibers (the seventh fibers 17b) is reduced, and the optical fibers are gently held as a whole while a light guiding property is maintained.

As can be seen from FIG. 6, with respect to the sixth fiber 16b, the first fiber 11b(11b1+11b2), is located by seven square units at the front side, and is located by one square unit at the rear side. This is repeated. The sixth fiber 16b is not largely exposed on the front surface so as to secure the strength of the woven fabric 500. The number of square units may not be seven, and may range from five to nine.

As can be seen from FIGS. 6, 7, and 8, with respect to the eighth fiber 18b, in the surface layer 21, the first fiber 11b1 is externally located by four square units, and is located by one square unit at the rear side. In the back layer 23, the first fiber 11b2 is externally exposed by one square unit, and are located by three square units at the rear side. Thus, there is a periodicity.

<Effect>

As in the first exemplary embodiment, in the light emitting region 52a, light is emitted, and in the fixing region 52b, the seventh fibers 17b (the optical fibers) are securely held while hidden from the front surface. The woven fabric 500 may stably emit light. That is, the seventh fibers 17b (the optical fibers) are not exposed on the front surface (the outermost surface), and held inside without being excessively bent. Thus, it is possible to protect the seventh fibers 17b (the optical fibers), to improve a light guiding property, and to uniformly emit light.

In this fifth exemplary embodiment, the pocket region 52c is present. Thus, it is easy to connect the optical fibers (the seventh fibers 17b) to, for example, a light source.

In the light emitting region 52a, the seventh fibers 17b (the optical fibers) are exposed on the front surface to emit light. In the fixing region 52b, the seventh fibers 17b (the optical fibers) are fixed inside. In the fixing region 52b, the optical fibers (the seventh fibers 17b) are hardly exposed on the front surface, and are only partially exposed on the front surface. Thus, the optical fibers are fixed and held without being excessively bent.

In the light emitting region 52a, a large number of optical fibers (the seventh fibers 17b) appear in the surface layer 21 to emit light.

In the fixing region 52b, the optical fibers (the seventh fibers 17b) are located in the intermediate layer 22, and then the optical fibers (the seventh fibers 17b) are fixed.

In the light emitting region 52a and the fixing region 52b, the eighth fibers 18b may couple the surface layer 21 to the back layer 23.

In the first to fourth exemplary embodiments, the surface layer 21 and the back layer 23 are exchanged, and the whole is integrated. In this example, the eighth fibers 18b couple the surface layer 21 to the back layer 23. As a result, all woven fabrics in the first to fifth exemplary embodiments are integrated as a whole.

First to Fifth Exemplary Embodiments

The proportion of the first fibers 11b located on the front side of the seventh fibers 17b (the optical fibers) in the fixing region 52b is larger than the proportion of the first fibers 11b located on the front side of the seventh fibers 17b (the optical fibers) in the light emitting region 52a.

Various weaving methods such as satin weave and ridge weave may be employed without being limited to the method of weaving the surface layer 21 and the back layer 23.

The above first to fifth exemplary embodiments may be combined with each other.

Sixth Exemplary Embodiment

FIG. 12A to FIG. 13B are views for explaining a sixth exemplary embodiment. Items not described are the same as those in the above exemplary embodiments.

Figure 12A:
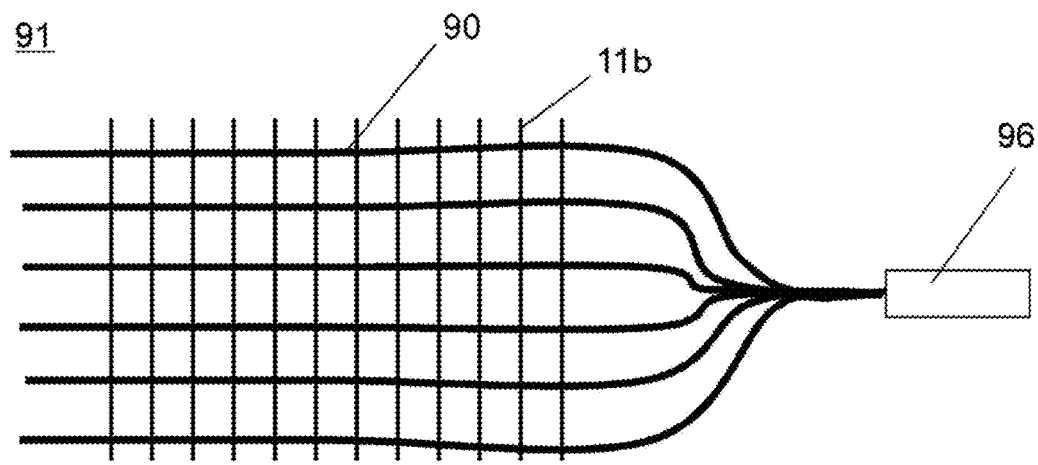
FIG. 12A is a view of a woven fabric 91 according to the first to fifth exemplary embodiments.

FIG. 12A is an end portion of a woven fabric 91 in the above first to fifth exemplary embodiments, which illustrates a state of a portion in which an optical fiber 90 is connected to an LED light source 96.

Figure 12B:
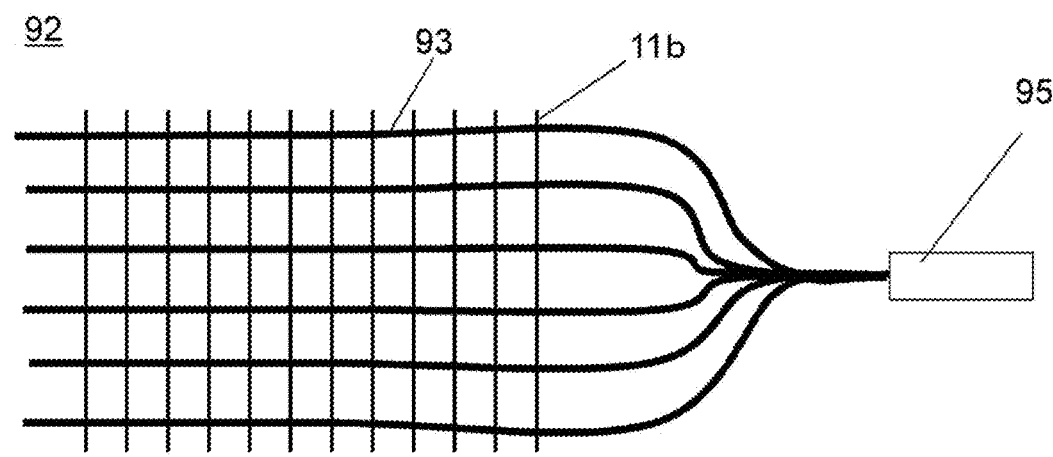
FIG. 12B is a view of a woven fabric 92 according to a sixth exemplary embodiment.

FIG. 12B is an end portion of a woven fabric 92 according to the sixth exemplary embodiment. The optical fiber 90 is replaced with a pipe 93 which is a tubular body, and the LED light source 96 is replaced with an odor source 95. The pipe 93 is a cord-shaped or a rod-shaped one such as a tube, an electric wire, a conductive thread, and a piezoelectric thread, with a hollow road inside.

The odor source 95 is a source of an odor, such as perfumes and chemicals, which may be either a liquid or a gas. In the case of chemicals, when a bactericidal agent is used, it is possible to perform sterilization in, for example, a hospital. Virus removal or bacteria removal may be performed. When chemicals harmful insects such as mosquitoes and flies hate are used in the source, it is also possible to keep the harmful insects away.

In coupling with a source of cold wind or warm wind as the odor source 95, it is possible to emit the cold wind or the warm wind. Here, a source of the cold wind or the warm wind is, for example, a fan, a cold blower, a combination of a heater with an air blower, or a combination of ice or dry ice with an air blower.

When the pipe 93 is a fiber through which electricity flows, and the odor source 95 is a battery, the pipe 93 acts as a heater to perform heating. Due to static electricity, it is possible to repel, for example, dust of a room. The pipe 93 may also be coupled with an electrical outlet or a storage battery instead of the battery.

Items not described are the same as those in the above exemplary embodiments.

In the woven fabric 92, an odor is carried from the odor source 95 to the pipe 93, and is emitted from the woven fabric 92. When the woven fabric 92 is applied to, for example, curtains or wallpapers, it is possible to spread the odor in the room.

Figure 12C:
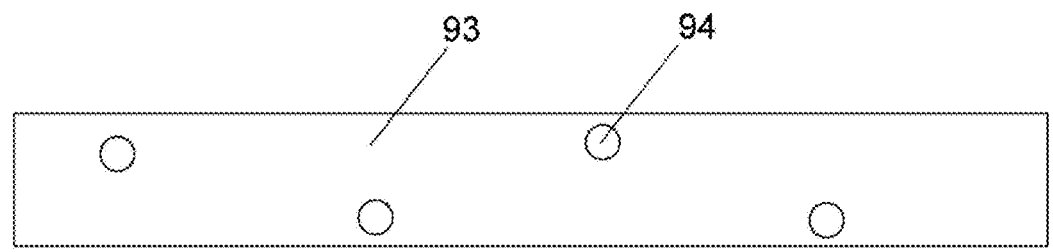
FIG. 12C is a view illustrating a pipe 93 of the woven fabric 92 according to the sixth exemplary embodiment.

FIG. 12C is the pipe 93. The pipe 93, which is a tubular body, has a hollow inside, and may carry an odor. The pipe 93 is woven with the first fiber 11b. Then, various gases such as an odor are emitted from openings 94 to the outside. When the proportion of opening areas of the openings 94 increases as a distance from the odor source 95 increases, the odor is easily emitted from the whole.

Figure 13A:
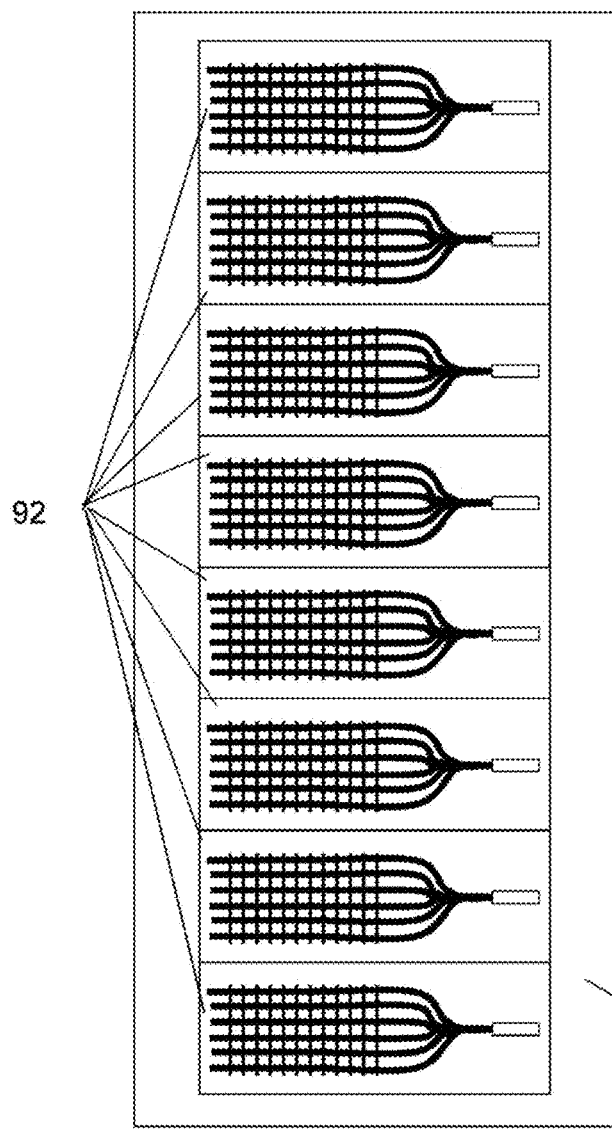
FIGS. 13A and 13B are views illustrating an application example of the woven fabric 92 according to the sixth exemplary embodiment.
Figure 13B:
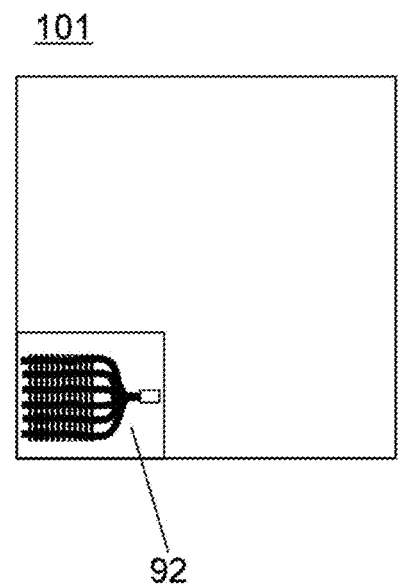

FIGS. 13A and 13B are views illustrating an application example of the woven fabric 92 according to the sixth exemplary embodiment.

In FIG. 13A, the woven fabric 92 is incorporated in a base 102 such as a curtain or a wall. A use in a car interior, a room interior, or a toilet interior is also possible. In FIG. 13B, the woven fabric 92 is arranged in apart of an article 101. The woven fabric 92 may be arranged in a part of, for example, a household appliance or information equipment as the article 101.

As compared to a conventional case where, for example, a scent is emitted from one point, for example, the scent is emitted from a plane. Thus, for example, the scent more efficiently reaches people.

In the woven fabric according to the above first to fifth exemplary embodiments, instead of the seventh fiber 17, the pipe 93 may be used. As with the optical fiber, it is easy to more efficiently emit a gas such as an odor when the pipe 93 is not bent.

Seventh Exemplary Embodiment

Lighting Device with Solar Cell

A seventh exemplary embodiment relates to a lighting device 801. Items not described are the same as those in the above exemplary embodiments.

<Structure>

Figure 14A:
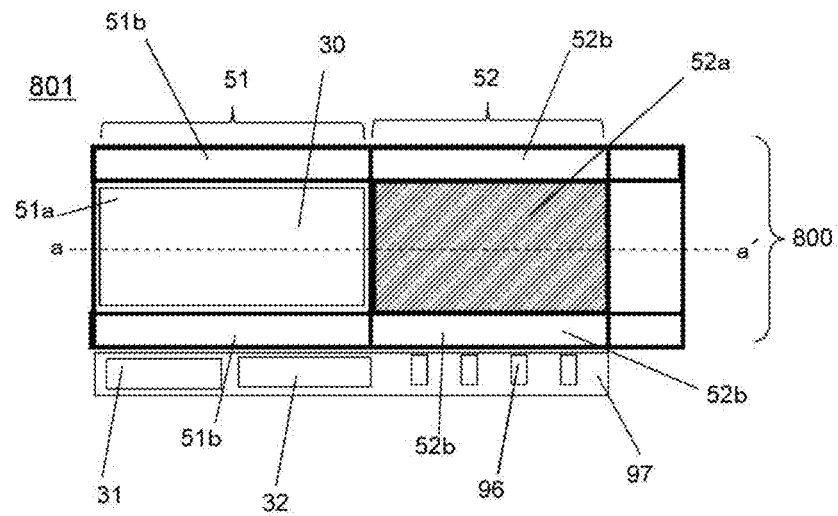
FIG. 14A is a plan view of a lighting device 801 according to a seventh exemplary embodiment.
Figure 14B:
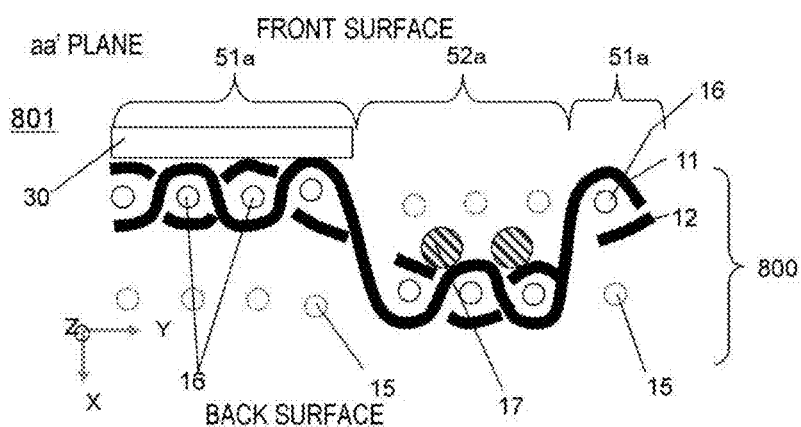
FIG. 14B is a cross-sectional view taken along the a-a plane in FIG. 14A, in an enlarged scale.

FIG. 14A illustrates a plan view of the lighting device 801. FIG. 14B illustrates a cross-sectional view taken along the a-a plane in FIG. 14A, in an enlarged scale. The lighting device 801 includes a woven fabric 800, a flexible substrate 97, and a solar cell 30.

The flexible substrate 97 is a circuit board made of a polyimide sheet, which is a flexible and bendable substrate. A secondary battery 31, a controller 32, and the LED light source 96 are mounted, and connected to each other by, for example, wiring.

The woven fabric 800 corresponds to the woven fabric 100 according to the first exemplary embodiment in FIG. 1. Meanwhile, woven fabrics according to other exemplary embodiments may be employed. As the woven fabric, a woven fabric, in which optical fibers are woven and partially appear on the front surface, may be employed.

The secondary battery 31 is a secondary battery such as a lithium battery, which stores electricity generated by the solar cell 30.

The solar cell 30 is arranged on the upper surface of a region other than the light emitting region 52a of the woven fabric 800 (a portion in which optical fibers are not exposed on the front surface). In FIG. 14A, the solar cell 30 is arranged on the first decorative region 51a. It is desirable that the solar cell 30 is arranged in a region other than the light emitting region 52a. The solar cell 30 is, for example, an Si-based planar solar cell. The solar cell 30 receives light, generates electricity, and then sends the electricity to the secondary battery 31.

The controller 32 controls turning ON/OFF of the LED light source 96. The whole of the lighting device 801 is controlled. The controller 32 is, for example, an IC.

The LED light source 96 is a light emitting element such as an LED. A light emission color of the LED is selected as necessary. The LED light source 96 irradiates the optical fibers of the woven fabric 800 with light. The optical fibers transmit light while emitting the light from the side surface.

<Operation>

Figure 14C:
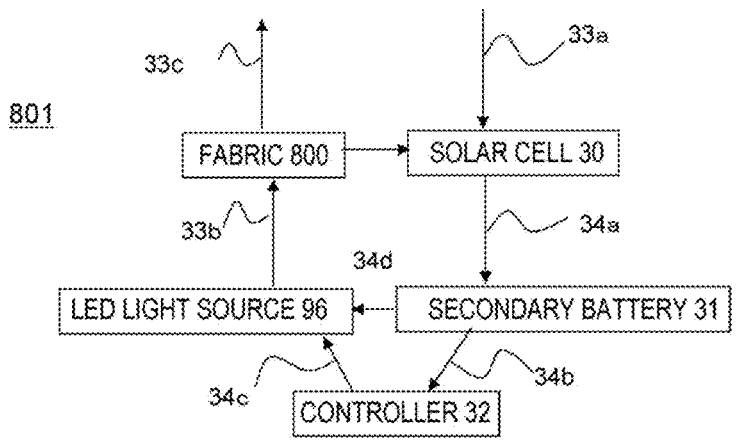
FIG. 14C is a flow chart of the operation of the lighting device 801 according to the seventh exemplary embodiment.

FIG. 14C illustrates the flow of the operation of the lighting device 801.

(1) The solar cell 30 receives light 33a.

(2) The solar cell 30 generates electricity 34a.

(3) The solar cell 30 supplies the electricity 34a to the secondary battery 31.

(4) The secondary battery 31 supplies electricity 34b to the controller 32, and electricity 34c to the LED light source 96.

(5) The LED light source 96 is turned ON by electricity 34d of the secondary battery 31 according to a signal of the controller 32, to emit light 33b.

(6) The woven fabric 800 emits light 33c to the outside, while transmitting the light 33b by the optical fibers, so that decorativeness is exhibited.

The controller 32 may perform various controls. Separately, a light sensor is included, so that during the daytime, light is stored by the solar cell 30, and at night, the LED light source 96 is turned ON, thereby emitting the light from the optical fibers of the woven fabric 800.

The controller 32 may also limit a light intensity of the LED light source 96 according to a charging amount of the secondary battery 31, so that lighting-up is performed for a long time.

By an external remote controller, the controller 32 may also be instructed to control turning-ON/OFF of the LED light source 96.

It is also possible to perform a control such that the LED light source 96 is flickering, or the plurality of LED light sources 96 are turned ON through time shifting.

<Effect>

Since the solar cell 30 is included, a separate power supply is unnecessary. Since the separate power supply is unnecessary, in retrofitting, providing in, for example, a house, a building, or a portable object is possible. It is possible to arrange the lighting device 801 with a decorativeness in, for example, a wall.

<First Modification>: Spherical Solar Cell

Figure 15:
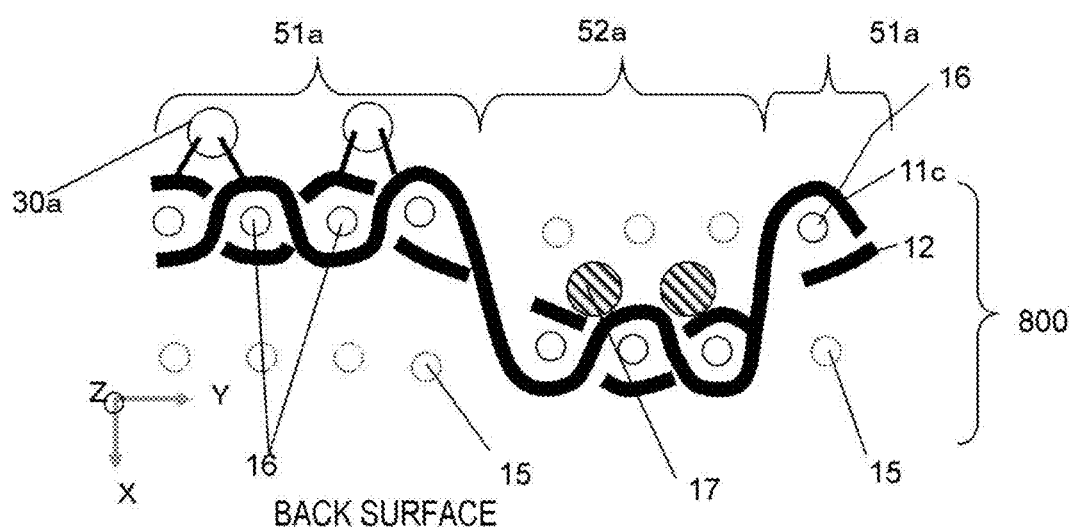
FIG. 15 is a plan view of a modification of the lighting device 801 according to the seventh exemplary embodiment.

FIG. 15 is a modification of the lighting device 801, which is a cross-sectional view of a lighting device 802 using a spherical solar cell 30a as the solar cell 30, in an enlarged scale.

As the spherical solar cell 30a, a solar cell manufactured by Sphere Power Co., Ltd. may be used. Wiring of the spherical solar cell 30a may be separately provided, but a conductive wire may be used as a fiber 11c. A conductive wire covered with a resin film is used. In a portion of connection with the spherical solar cell 30a, the cover is opened so that connection with the spherical solar cell 30a is made. The spherical solar cell 30a has a light emit efficiency better than the general solar cell 30. Since the spherical solar cell 30a is spherical, decorativeness is good. Thus, it is possible to secure the design property of the whole of the lighting device 802.

<Second Modification>: Use of LED Light

Figure 16:
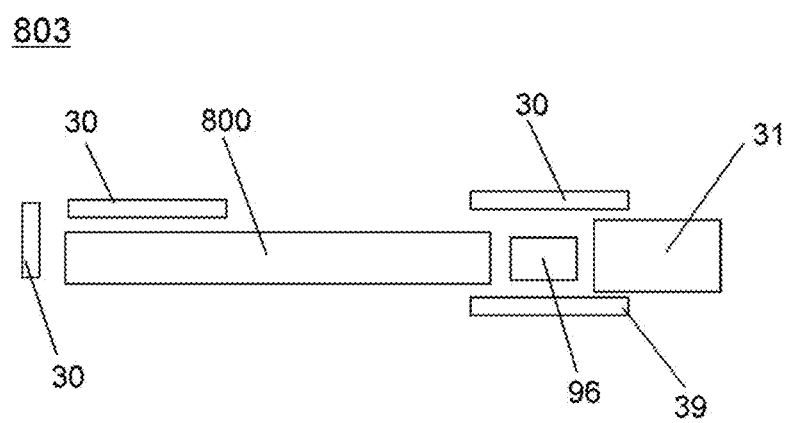
FIG. 16 is a plan view of a modification of the lighting device 801 according to the seventh exemplary embodiment.

FIG. 16 is a lighting device 803, as a modification of the lighting device 801. FIG. 16 is a cross-sectional view of the vicinity of the LED light source 96 of the lighting device 803. Items not described are the same as those in the above described lighting device.

The solar cell 30 and a reflection plate 39 are arranged above and below the LED light source 96. Optical fibers within the woven fabric 800 are irradiated with light of the LED light source 96. However, the light leaks to some extent. In order to use the leaking light, conversion into electricity is performed by the solar cell 30.

The solar cell 30 is disposed on at least one of upper and lower sides of the LED light source 96, and the reflection plate 39 is disposed on the other side. The reflection plate 39 reflects light, and then directs the light toward the solar cell 30. Also, the solar cell 30 may be provided on a side opposite to a side on which the LED light source 96 is present in the woven fabric 800. Light leaking at the ends of the optical fibers may be picked up by the solar cell 30. Light energy may be used without waste.

In FIG. 14A to FIG. 16, the solar cell 30 is not essential, and an electric power may be provided from, for example, a separate outlet.

(Eighth Exemplary Embodiment): Lighting Device of Wall

An eighth exemplary embodiment relates to a lighting device 804. Items not described are the same as those in the seventh exemplary embodiment.

<Structure>

The lighting device 804 is a lighting device arranged on, for example, a corner or a curved surface. The woven fabric according to the exemplary embodiment, as described above, has optical fibers, but may be bent to some extent.

Figure 17A:
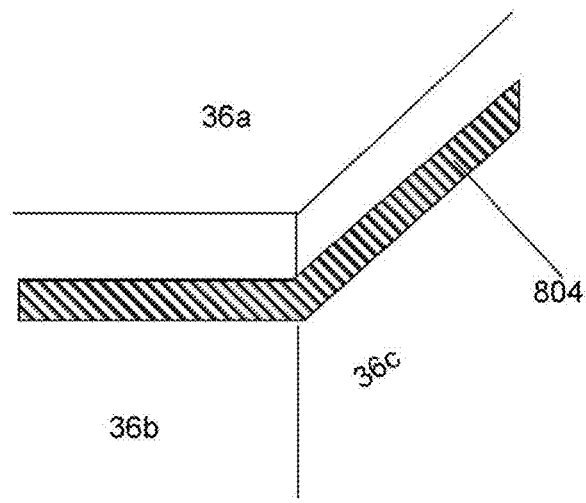
FIG. 17A is a perspective view of a lighting device 804 according to an eighth exemplary embodiment.
Figure 17B:
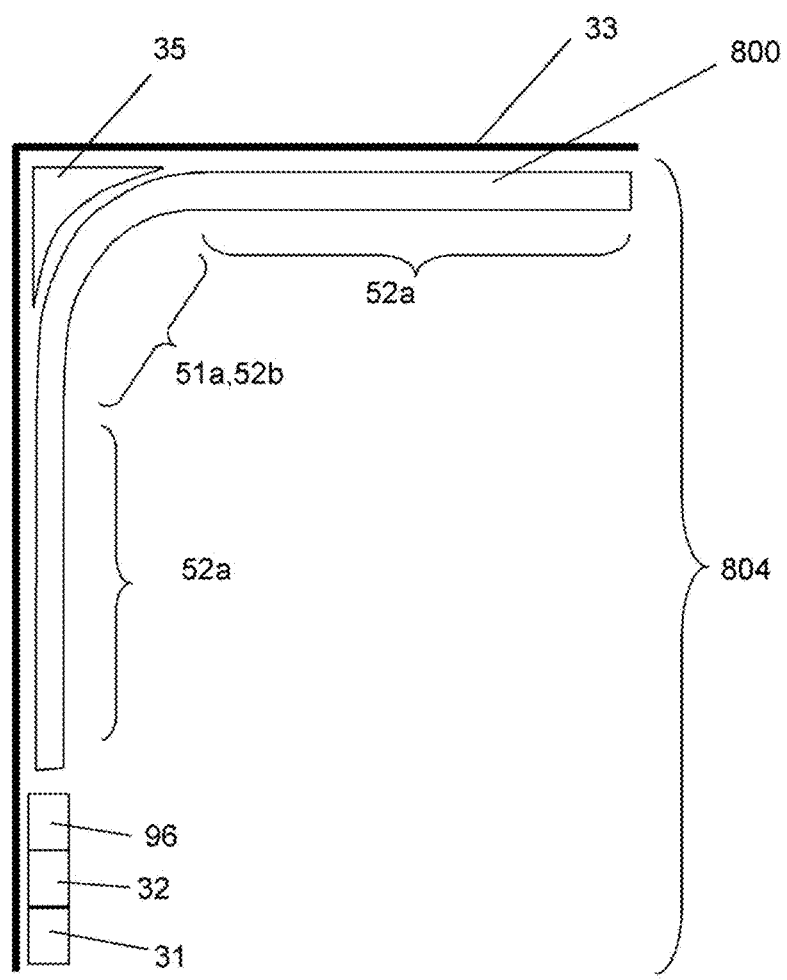
FIG. 17B is a plan view of FIG. 17A.
Figure 18:
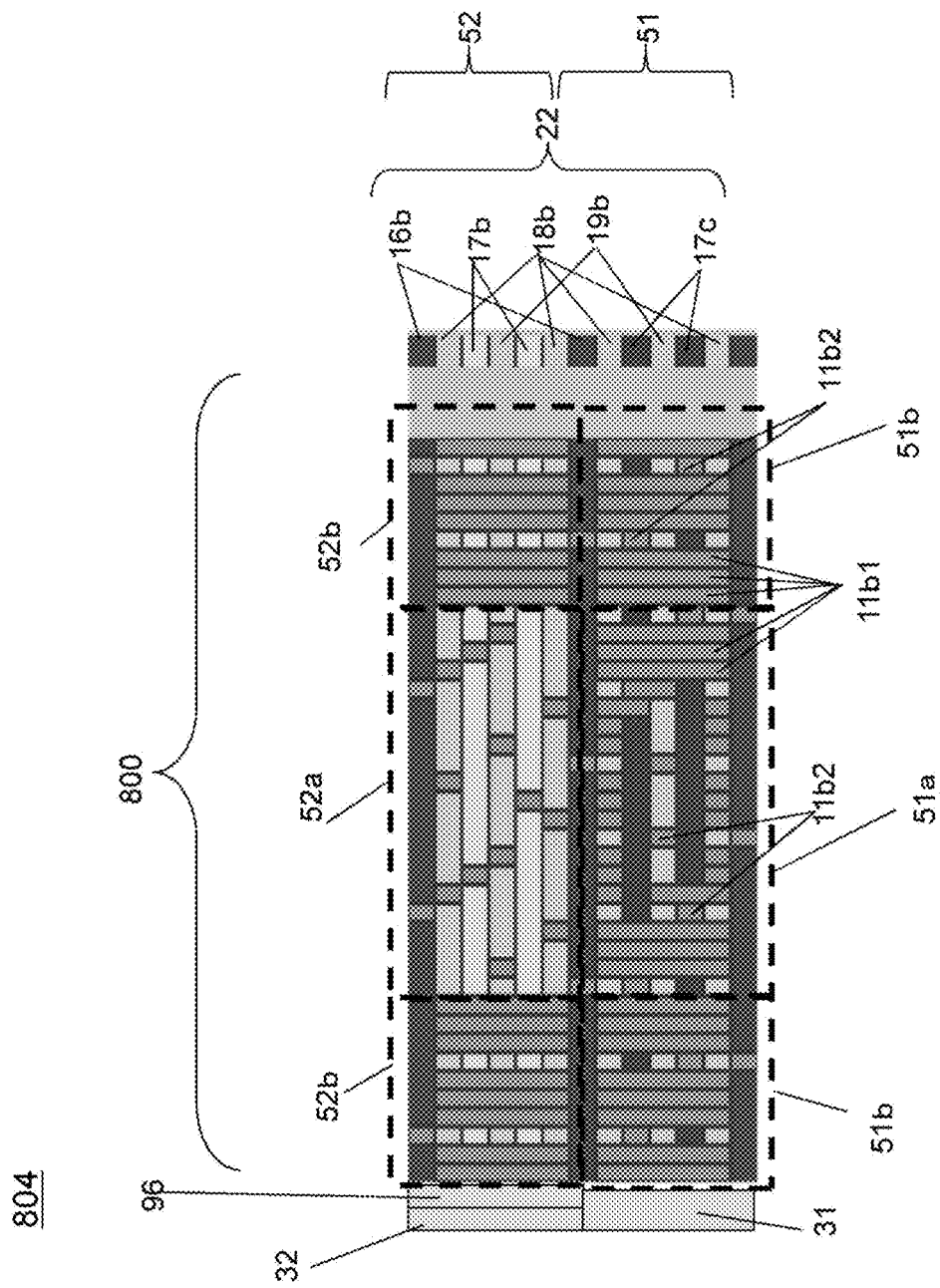
FIG. 18 is a plan view of the lighting device 804 according to the eighth exemplary embodiment.

FIG. 17A is a perspective view in which the lighting device 804 is arranged across two walls, via a corner portion between walls 33. FIG. 17B is a plan view of FIG. 17A. FIG. 18 is a plan view of the lighting device 804.

The lighting device 804 includes the woven fabric 800, the LED light source 96, the controller 32, the secondary battery 31, and a corner portion 35.

<Lighting Device 804>

FIG. 18 illustrates a plan view of the lighting device 804. In the lighting device 804, the controller 32, the secondary battery 31, and the LED light source 96 are arranged in the woven fabric in FIG. 4.

The woven fabric 800 may be the woven fabric of the above other exemplary embodiments. Woven optical fibers suffices for the woven fabric. Meanwhile, a woven fabric having the decorative region 51 is desirable.

In the daytime, there is no acting as lighting, and the decorative region 51 acts as a decorative object.

<Corner Portion 35>

The corner portion 35 is used to secure a bending range of the woven fabric 800 within a certain range. Since optical fibers are present within the woven fabric 800, when a bending angle is made steep, a light guiding property deteriorates. Thus, it is better to make the bending angle as gentle as possible. It is desirable that the corner portion 35 is made of a rubber having elasticity. Respective optical fibers vary, and thus in order to absorb these, alleviation is made by the corner portion 35 with elasticity.

In the corner portion 35, a portion in contact with the woven fabric 800 has a gradually bent and curved shape, that is, a shape with a columnar side surface. Another portion of the corner portion 35 is a portion in contact with walls 36a and 36b, and has a flat surface. The corner portion 35 has a shape in which one surface of a triangular prism is formed as a cylindrical side surface.

(Ninth Exemplary Embodiment): Bag

Figure 19A:
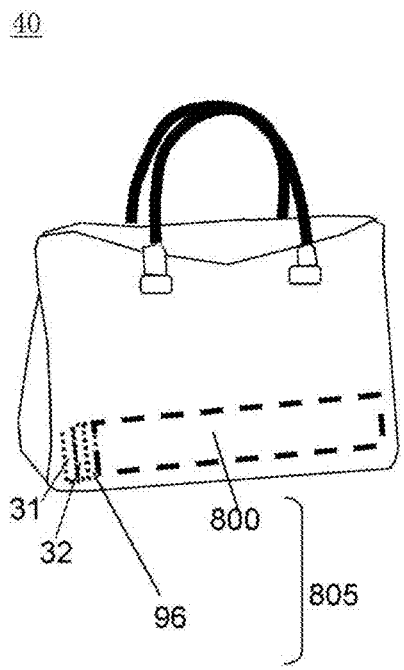
FIG. 19A is a perspective view of a bag 40 according to a ninth exemplary embodiment.
Figure 19B:
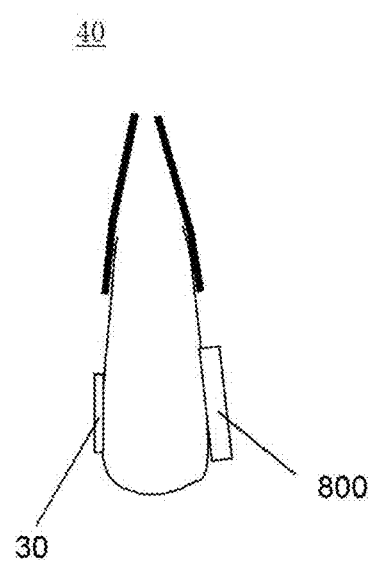
FIG. 19B is a cross-sectional view of the bag 40 according to the ninth exemplary embodiment.

A ninth exemplary embodiment relates to a bag 40. Items not described are the same as those in the above exemplary embodiments. FIG. 19A is a perspective view of the bag 40. FIG. 19B is a cross-sectional view of the bag 40. Items not described are the same as those in the above exemplary embodiments.

<Structure>

In the bag 40, a lighting device 805 is arranged. The lighting device 805 includes the controller 32, the woven fabric 800, the LED light source 96, the solar cell 30, and the secondary battery 31.

The woven fabric 800 is located on the side surface of the front surface of the bag 40. The solar cell 30 is located on the side surface of the back surface.

The solar cell 30 is located on an unnoticed back surface, and generates electricity, and then stores the electricity in the secondary battery 31. The solar cell 30 is coupled with the secondary battery 31 (not illustrated).

The woven fabric 800 shines when the LED light source 96 glows, for example, at night.

In the woven fabric 800, in a light emitting region, it is possible to display, for example, a maker name, a brand name, or a brand mark of a bag. For such a purpose, it is desirable that optical fibers in a portion corresponding to a marked portion are allowed to appear on the front surface.

<Controller 32>

The controller 32 controls turning ON/OFF of the LED light source 96.

(1) It is desirable that a light sensor is separately provided so that the LED light source 96 may be turned ON when it gets dark, for example, at night.

(2) It is desirable to control the lighting intensity of the LED light source 96 based on the quantity of electricity stored in the secondary battery 31.

(3) It is desirable that the controller 32 detects that the bag 40 is placed on, for example, a floor or a desk so as to turn OFF the LED light source 96.

<Modification>

The solar cell 30 may not be mounted in the bag 40, while the secondary battery 31 may be separately charged, and held in the bag 40.

The woven fabric 800 emits light to the outside of the side surface of the bag 40, but it is desirable to emit a part of light to the interior of the bag 40 as well. It is easy to find things among contents of the bag 40.

(Tenth Exemplary Embodiment): Curtain 41 or Wall Lighting

A tenth exemplary embodiment relates to a curtain 41 or a wall lighting. The following description is made on a use as the curtain 41, but a use as a wall lighting device is also possible.

Items not described are the same as those in the above exemplary embodiments.

Figure 20A:
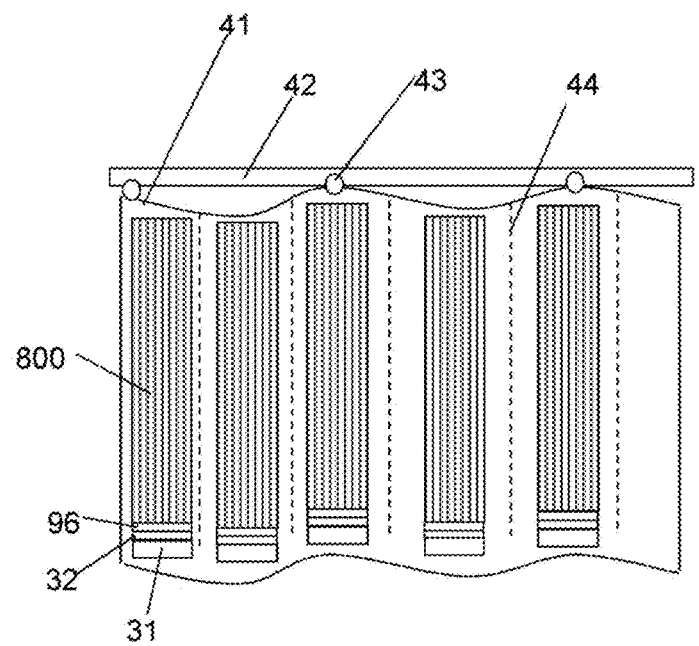
FIG. 20A is a front view of a curtain 41 according to a tenth exemplary embodiment.
Figure 20B:
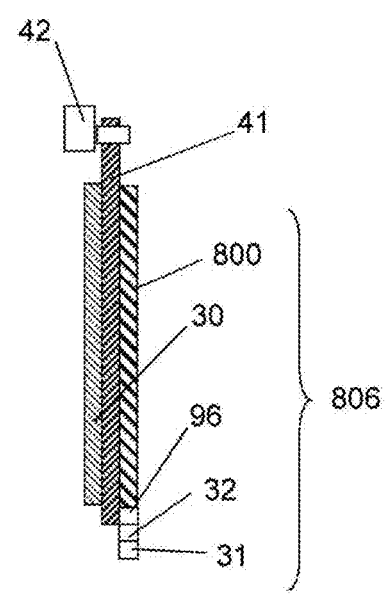
FIG. 20B is a cross-sectional view of the curtain 41 according to the tenth exemplary embodiment.

FIG. 20A is a front view of the curtain 41. FIG. 20B is a cross-sectional view of the curtain 41.

<Structure>

A lighting device 806 is arranged in the curtain 41. The lighting device 806 includes the controller 32, the woven fabric 800, the LED light source 96, the solar cell 30, the secondary battery 31, and a main body 45.

The woven fabric 800 is located on the front surface of the curtain 41. The solar cell 30 is located on the back surface of the curtain 41.

The solar cell 30 stores electricity in the secondary battery 31.

The woven fabric 800 shines when the LED light source 96 glows, for example, at night.

<Controller 32>

The controller 32 controls turning ON/OFF of the LED light source 96. It is desirable that a light sensor is separately provided so that the LED light source 96 may be turned ON when it gets dark, for example, at night. It is desirable to control the lighting intensity of the LED light source 96 based on the quantity of electricity stored in the secondary battery 31.

<First Modification>

Figure 20C:
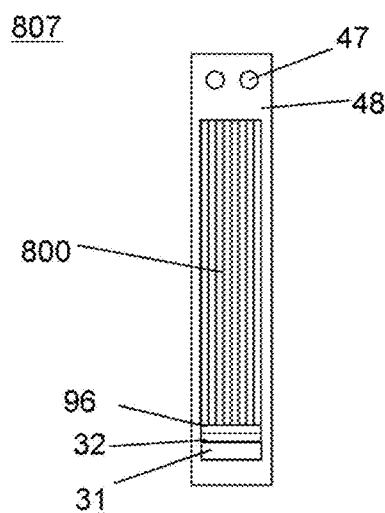
FIGS. 20C and 20D are front views of a lighting device 807 as a modification of a lighting device 806 according to the tenth exemplary embodiment.

FIG. 20C illustrates a front view of a lighting device 807, as a modification of the lighting device 806. On a base 48, the controller 32, the woven fabric 800, the LED light source 96, and the secondary battery 31 are provided, and on the back surface, the solar cell 30 is provided. There is a fixing portion 47 on the base 48. The solar cell 30 is not essential, and electricity may be supplied from a power supply.

The fixing portion 47 may be hooked on, for example, a hook, a concave portion, or a convex portion of a wall with, for example, an opening, a hook, or a protrusion. A use for room decoration is possible.

<Second Modification>

Figure 20D:
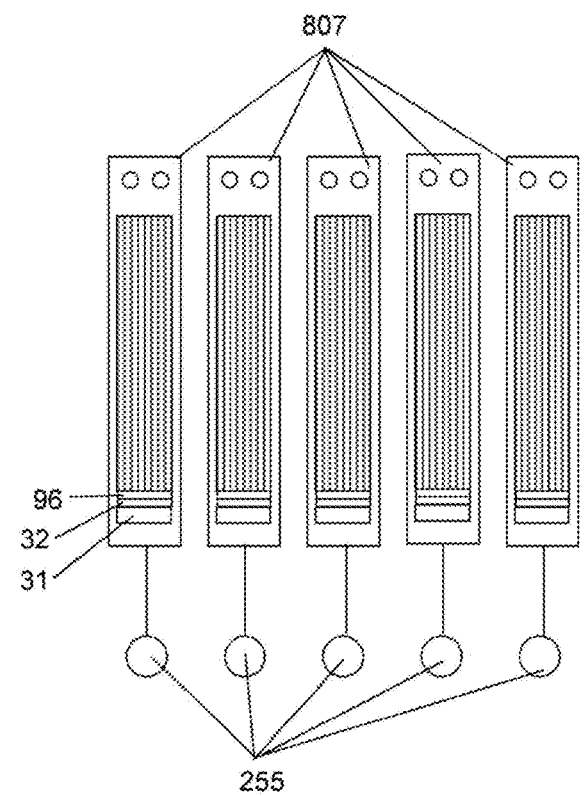

FIG. 20D illustrates a front view of a lighting device 807, as a modification of the lighting device 806. There are a plurality of lighting devices 807, which are connected to touch sensors 255. When the touch sensor 255 is touched, the corresponding lighting device 807 is turned ON.

Instead of the touch sensor 255, a pressure sensor may be employed. The lighting devices 807 may emit light with different patterns, respectively. For example, characteristics or patterns may be displayed. A color in each lighting device 807 may be changed.

(Eleventh Exemplary Embodiment): Stairs Lighting

Figure 21:
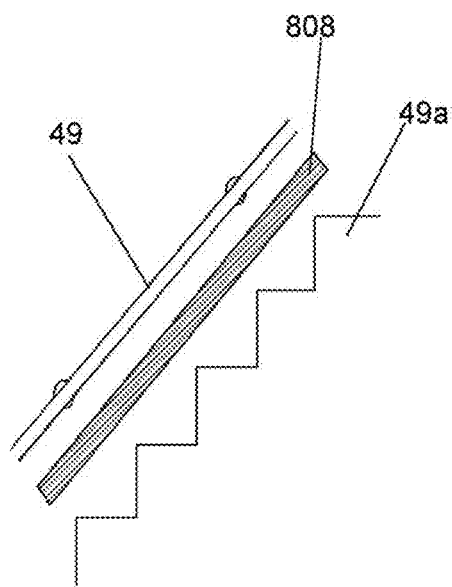
FIG. 21 is a plan view of a lighting device 808 according to an eleventh exemplary embodiment.
Figure 22:
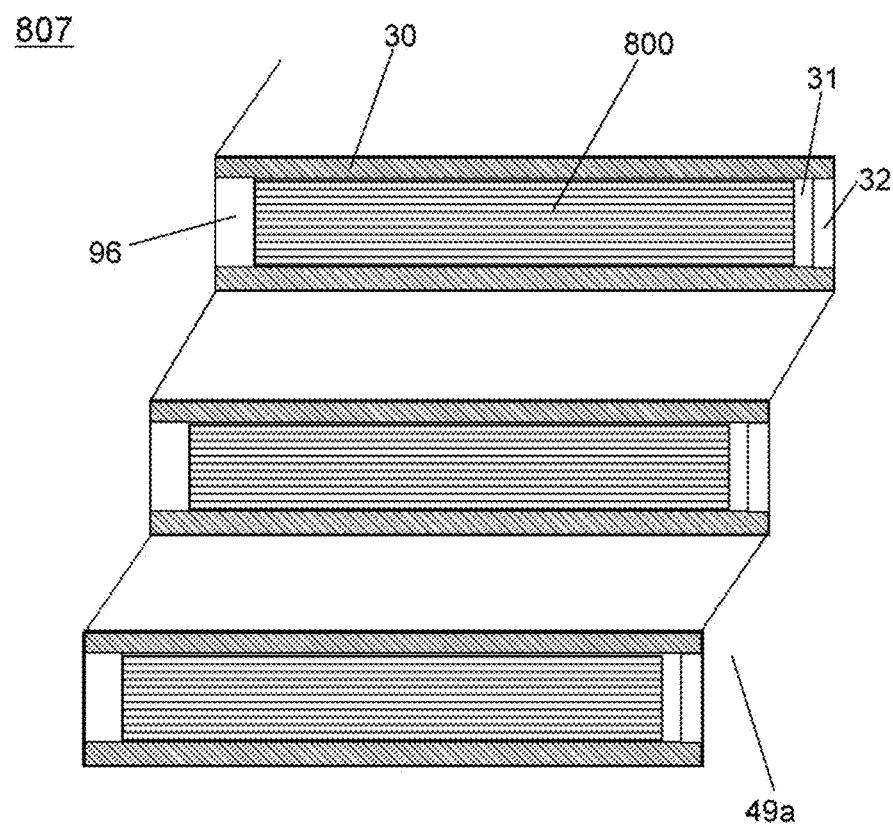
FIG. 22 is a plan view of a lighting device 807 according to the eleventh exemplary embodiment.

An eleventh exemplary embodiment is a lighting device in stairs 49a. FIG. 21 illustrates a plan view of a lighting device 808, and FIG. 22 illustrates a plan view of the lighting device 807.

<Structure>

The lighting device 807 is arranged in a stair riser portion between respective steps of the stairs 49a. In the vicinity of the woven fabric 800, the solar cell 30, the secondary battery 31, the controller 32, and the LED light source 96 are arranged. The woven fabric 800 in the central portion of the lighting device 807 glows to exhibit a decorativeness.

The lighting device 808 is arranged on the wall in parallel to inclination of the stairs 49a. The lighting device 808 includes the woven fabric 800, the solar cell 30, the secondary battery 31, the controller 32, and the LED light source 96 (not illustrated). The LED light source 96 is arranged on an end portion, and then supplies light from the end portion to the woven fabric 800. From bottom to top, more light is emitted. The reverse is also possible. By studying a proportion of optical fibers appearing on the front surface in the woven fabric 800, it is possible to change the degree of emission of light toward the outside, at each place of the stairs 49a. Then, each place on the stairs may be recognized. Optical fibers may be lighted up at regular intervals. A sensor that senses a person may be separately provided so as to sense a person and to light up the optical fibers. Then, the person receives a good impression, and then his mind is set at rest.

(Twelfth Exemplary Embodiment): Pocket Region 52c

The pocket region 52c has been described in the fifth exemplary embodiment. In the twelfth exemplary embodiment, the pocket region 52c is provided in an arbitrary place of a woven fabric. Items not described are the same as those in the fifth exemplary embodiment.

Figure 23:
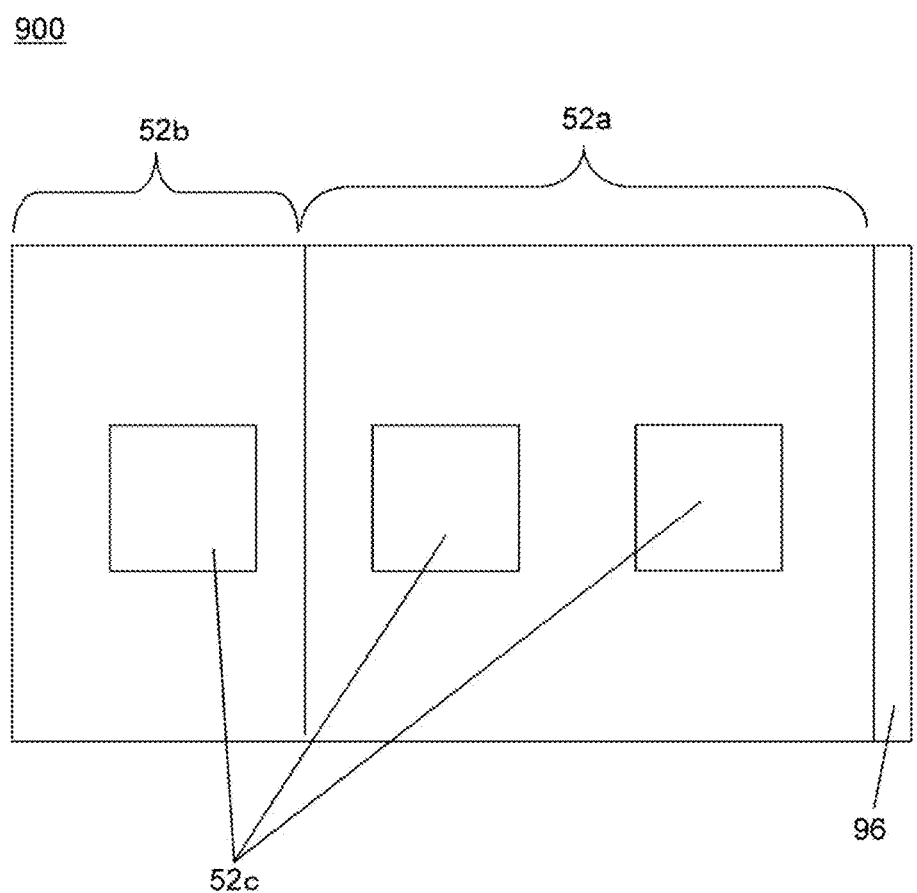
FIG. 23 is a plan view of a woven fabric 900 according to a twelfth exemplary embodiment.

FIG. 23 illustrates a plan view of a woven fabric 900. There is the pocket region 52c in the fixing region 52b and the light emitting region 52a. The place may be an arbitrary place.

In the pocket region 52c, optical fibers (the seventh fibers 17b) are not woven with other fibers. Thus, in this region, the optical fibers may be freely moved. Thus, for example, a clasp is disposed in the pocket region 52c so as to fix the woven fabric 900 to another object. Otherwise, when there is, for example, a protrusion in a thing for fixing, the pocket region 52c may also be used for passing-through of the protrusion.

Needless to say, a use in the lighting device according to the seventh to eleventh exemplary embodiments, and thirteenth and subsequent exemplary embodiments is also possible.

Thirteenth Exemplary Embodiment

Figure 24A:
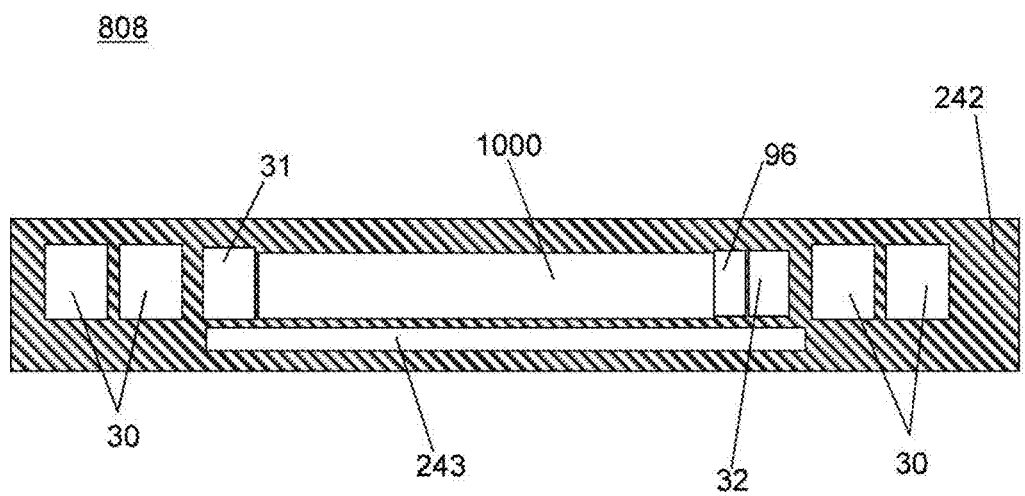
FIG. 24A is a cross-sectional view of a lighting device 808 according to a thirteenth exemplary embodiment.
Figure 24B:
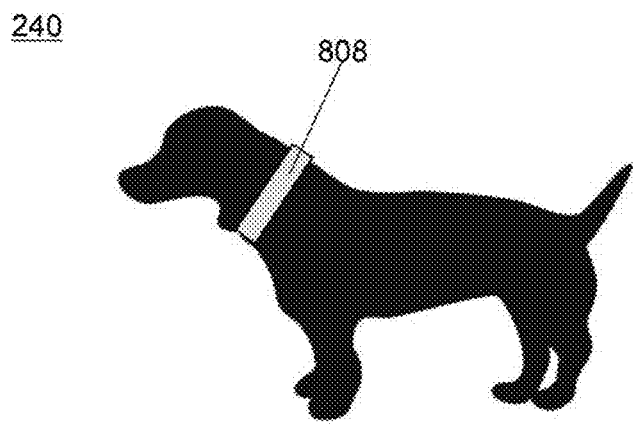
FIG. 24B is a view in which the lighting device 808 according to the thirteenth exemplary embodiment is applied to a dog collar.
Figure 24C:
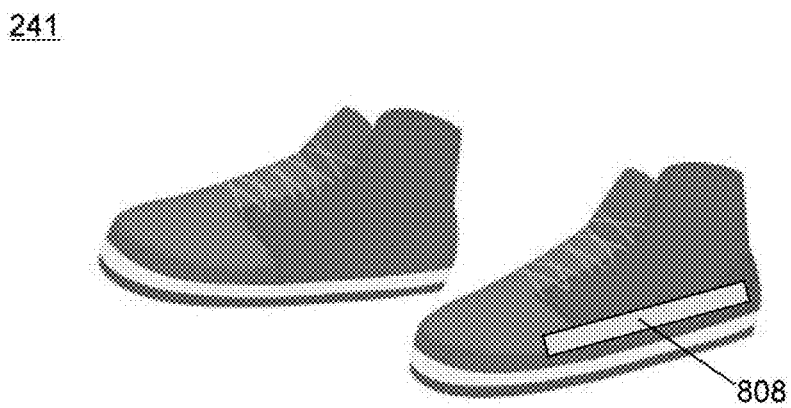
FIG. 24C is a view in which the lighting device 808 according to the thirteenth exemplary embodiment is applied to shoes.

A thirteenth exemplary embodiment relates to the lighting device 808 using the above described woven fabric. FIG. 24A is a cross-sectional view of the lighting device 808 according to the thirteenth exemplary embodiment. FIG. 24B and FIG. 24C are views in which the lighting device 808 is applied to a dog collar and shoes, respectively. Items not described are the same as those in the above exemplary embodiments.

The lighting device 808 includes a support 243, and a woven fabric 1000 above the support 243. There are the LED light source 96, the secondary battery 31, the controller 32, and the solar cell 30. These, as a whole, are sealed by a sealing portion 242.

As the woven fabric 1000, anyone among the woven fabrics according to the above exemplary embodiments may be used.

As the solar cell 30, a plurality of spherical solar cells, or a plurality of small-piece solar cells may be used. The lighting device 808 is devised to bend for use in transformation.

The support 243 is a reinforcing material that prevents the woven fabric 1000 from rapidly bending. For example, a metal, a rubber, or a resin may be used.

The sealing portion 242 is a flexible one made of, for example, resin or rubber and protects each member such as the woven fabric 1000. The sealing portion 242 protects contents from water and impact from the outside.

The lighting device 808 may be anyone among the lighting devices according to the above exemplary embodiments.

The lighting device 808 may be used by being attached to, for example, a person, a bag, an animal, or a vehicle.

Fourteenth Exemplary Embodiment

Figure 25A:
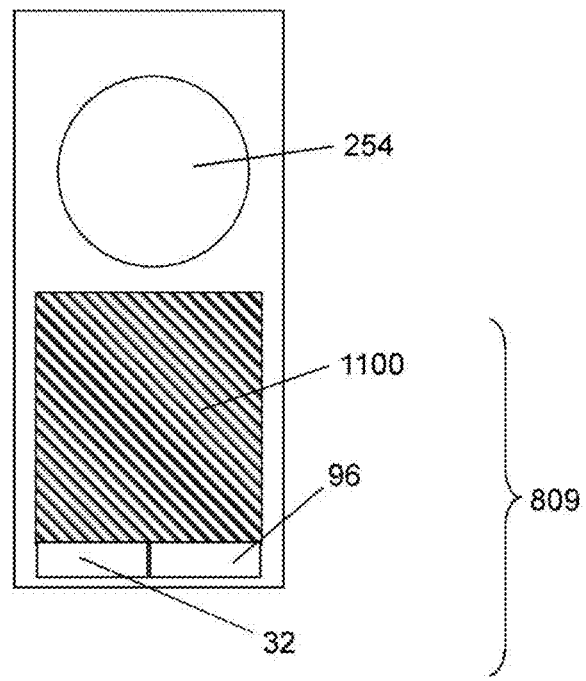
FIG. 25A is a front view of a speaker device 251 according to a fourteenth exemplary embodiment.

A fourteenth exemplary embodiment relates to a speaker device 251 using the above described woven fabric. FIG. 25A is a front view of the speaker device 251 according to the fourteenth exemplary embodiment. The speaker device 251 includes a speaker 254 and a lighting device 809. The lighting device 809 includes a woven fabric 1100, the LED light source 96, and the controller 32. Items not described are the same as those in the above exemplary embodiments.

The speaker 254 is a portion that transfers sound.

As the lighting device 809, any one among the woven fabrics in the above exemplary embodiments may be used.

The controller 32 may obtain instruction information from, for example, the speaker device 251, another medium, a smartphone, or a personal computer, and emit light in synchronization with sound of the speaker 254.

Otherwise, the controller 32 may detect vibration or sound of the speaker 254, and accordingly or synchronously emit light.

It is more desirable that the speaker device 251 further includes a solar cell and a secondary battery. The lighting device 809 may be any one among the lighting devices in the above exemplary embodiments.

Figure 25B:
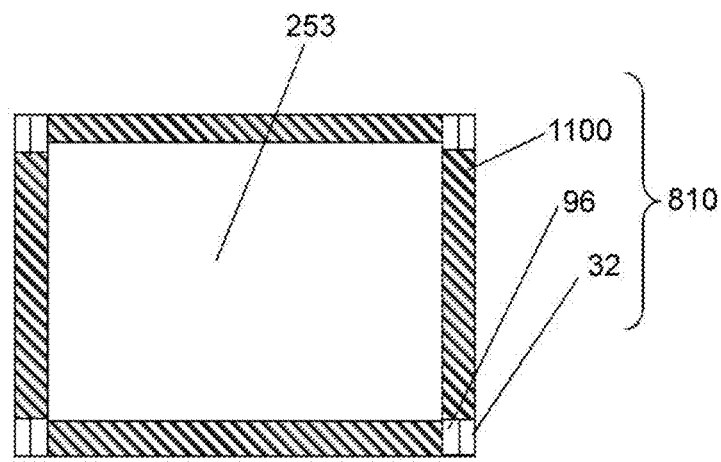
FIG. 25B is a front view of a monitor 252 according to the fourteenth exemplary embodiment.

FIG. 25B illustrates a front view of a monitor 252 in another example of the fourteenth exemplary embodiment. Items not described are the same as those in the above exemplary embodiments. The monitor 252 includes a screen 253 and a lighting device 810. The lighting device 810 includes the woven fabric 1100, the LED light source 96, and the controller 32.

The screen 253 displays images such as a TV, moves, and video on a display. The lighting device 810 is present around the screen 253.

The lighting device 810 may be a lighting device in the above exemplary embodiments. The woven fabric 1100 may also be a woven fabric in the above exemplary embodiments.

The controller 32 may obtain instruction information from, for example, the monitor 252, another medium, a smartphone, or a personal computer, and emit light in synchronization with images or sound of the screen 253. Otherwise, the controller 32 may also detect images of the screen 253, and accordingly or synchronously emit light.

It is more desirable that the monitor 252 further includes a solar cell and a secondary battery. The lighting device 810 may be any one among the lighting devices in the above exemplary embodiments.

Fifteenth Exemplary Embodiment

Figure 26A:
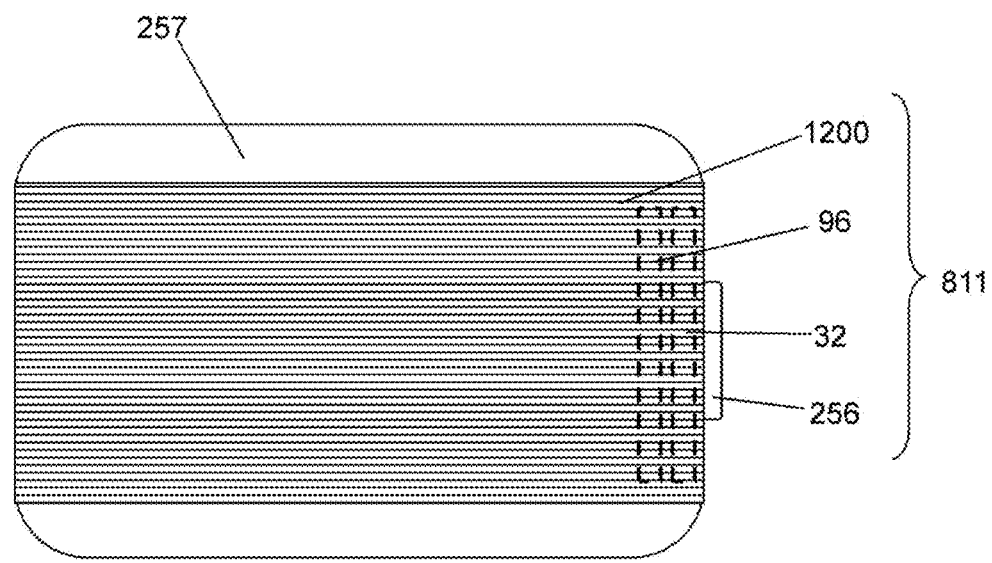
FIG. 26A is a front view of a mobile terminal 257 according to a fifteenth exemplary embodiment.
Figure 26B:
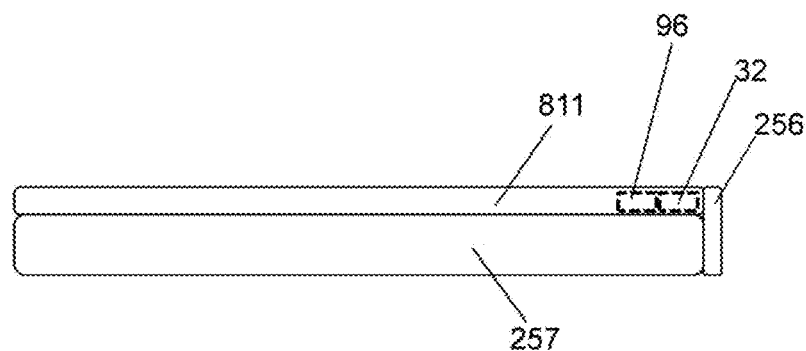
FIG. 26B is a side view of the mobile terminal 257 according to the fifteenth exemplary embodiment.

A fifteenth exemplary embodiment relates to a mobile terminal 257 using the woven fabric. FIG. 26A is a front view of the mobile terminal 257 according to the fifteenth exemplary embodiment. FIG. 26B is a side surface of the mobile terminal 257 according to the fifteenth exemplary embodiment. Items not described are the same as those in the above exemplary embodiments.

In the mobile terminal 257, a lighting device 811 is arranged on one surface. This is, for example, a portable device such as a smartphone.

The lighting device 811 includes a woven fabric 1200, the LED light source 96, the controller 32, and a connector 256.

As the woven fabric 1200, any one among the above described woven fabrics may be used.

The LED light source 96 is an LED, and is controlled by the controller 32.

The controller 32 controls the LED light source 96. This is, for example, an IC.

The connector 256 receives electricity from the mobile terminal 257 and supplies the electricity to the LED light source 96 and the controller 32.

The ON/OFF of the LED light source 96 of the lighting device 811 may be controlled by software or applications within the mobile terminal 257. For example, the LED light source 96 may be flickering according to communication of the mobile terminal 257, or a manner in which the LED light source 96 is turned ON may be changed according to the type of communication, for example, mail reception, SNS reception, incoming call, or line reception.

As a result, a design property of the mobile terminal 257 is further increased.

(As A Whole)

The exemplary embodiments may be combined with each other. A solar cell is not essential, and a power may also be taken from, for example, an outlet.

A method of manufacturing the woven fabric according to the exemplary embodiments may be performed by using a loom mounted with a dobby machine or a jacquard machine.

The woven fabric and the lighting device in the present disclosure are widely used. These are applied to, for example, an interior and a ceiling cloth of an automobile, and a wall, a ceiling, and stairs of a tram an airplane. Further, a use as a cloth or a lighting for a wall of a structure, a house, a facility, and a building is also possible.

What is claimed is:
1. A woven fabric (100) comprising:
an optical region (52) and a decorative region (51),
wherein the optical region (52) is a region where a seventh fiber (17) being an optical fiber is woven, and the decorative region (51) is a region where no optical fiber is present,
wherein the optical fiber region (52) includes a fixing region (52b) and a light emitting region (52a),
wherein the fixing region (52b) is a region where the seventh fiber (17) is fixed; and
wherein the light emitting region (52a) is a region where light is emitted from the optical fiber toward a front side surface,
wherein the decorative region (51) includes a first decorative region (51a) and a second decorative region (51b), wherein the first decorative region (51a) is a region adjacent to the light emitting region (52a), and the second decorative region (51b) is a region adjacent to the fixing region (52b),
wherein the woven fabric is woven by a first fiber (11) to the seventh fiber (17);
wherein, in a surface layer (21) of the second decorative region (51b), the first fiber (11) and a second fiber (12) are located in a Y direction, and a sixth fiber (16) is located in parallel to a Z direction, the sixth fiber (16) being woven with the first fiber (11) and the second fiber (12),
wherein, in a back layer (23) of the second decorative region (51b), a third fiber (13) and a fourth fiber (14) are located in the Y direction, and a fifth fiber (15) is located in parallel to the Z direction, the fifth fiber (15) being woven with the third fiber (13) and the fourth fiber (14), and
wherein, in an intermediate layer (22) of the second decorative region (51b), the seventh fiber (17) is not present;
wherein, in the surface layer (21) of the fixing region (52b), the third fiber (13) and the fourth fiber (14) are located in the Y direction, and the fifth fiber (15) is located in parallel to the Z direction, the fifth fiber (15) being woven with the third fiber (13) and the fourth fiber (14),
wherein, in the back layer (23) of the fixing region (52b), the first fiber (11) and the second fiber (12) are located in the Y direction, and the sixth fiber (16) is located in parallel to the Z direction, the sixth fiber (16) being woven with the first fiber (11) and the second fiber (12), wherein, in the intermediate layer (22) of the fixing region (52b), the seventh fiber (17) being an optical fiber is located in parallel to the Z direction, wherein the seventh fiber (17) being an optical fiber is interposed and fixed in a space between the surface layer (21) and the back layer (23) and is not woven into another fiber, wherein in the light emitting region (52a), the decorative region (51a) and at left and right sides of the light emitting region (52a), the third fiber (13) and the fourth fiber (15) are not present, and wherein the surface layer (21) of the first decorative region (51a) is the same as the surface layer (21) of the second decorative region (51b), and the first fiber (11) and a second fiber (12) are located in a Y direction, and a sixth fiber (16) is located in parallel to a Z direction, the sixth fiber (16) being woven with the first fiber (11) and the second fiber (12), wherein, in the back layer (23) of the first decorative region (51a), the third fiber (13) and the fourth fiber (14) are not present, and the fifth fiber (15) is located in parallel to the Z direction, and wherein, in the intermediate layer (22) of the first decorative region (51a), the seventh fiber (17) is not present.

2. The woven fabric (100) according to claim 1, wherein an eighth fiber (18) other than an optical fiber is further arranged in the space of the intermediate layer (22) of the optical region (52).

3. The woven fabric (100) according to claim 2, wherein eighth fibers (18) are arranged at both sides of the seventh fiber (17).

4. The woven fabric (100) according to claim 3, wherein a plurality of seventh fibers (17) are provided, and
a ninth fiber (19) is arranged between the plurality of seventh fibers (19).

5. The woven fabric (100) according to claim 4, wherein a fiber diameter of the ninth fiber (19) is equal to or smaller than a fiber diameter of the seventh fiber (17).

6. The woven fabric (100) according to claim 1,
wherein a diameter of the sixth fiber (16) is larger than a diameter of the eighth fiber (18).

7. The woven fabric (100) according to claim 1,
wherein a plurality of third fibers (13) and fourth fibers (14 is present in the surface area in the light emitting region (52a), and
wherein numbers of the third fibers (13) and fourth fibers (14) in the light emitting region (52a) are reduced.

8. A lighting device comprising:
the woven fabric according to claim 1;
an LED light source; and
a controller that controls the LED light source.

9. A lighting device comprising:
the woven fabric according to claim 1;
an LED light source that irradiates the woven fabric with light;
a controller that controls the LED light source; and
a corner member located at a portion where the woven fabric is bent, wherein the corner member has a curved surface that supports a bending range of the woven fabric within a certain range.

10. A lighting device comprising:
the woven fabric according to claim 1;
an LED light source that irradiates the woven fabric with light;
a controller that controls the LED light source; and
a solar cell located around a joint between the LED light source and the woven fabric.

11. A lighting device comprising:
the woven fabric according to claim 1;
an LED light source that irradiates the woven fabric with light;
a controller that controls the LED light source;
a solar cell located on a portion of the woven fabric in which light is not emitted,
wherein the solar cell is not located on a portion of the woven fabric in which light is emitted.

12. A lighting device comprising:
the woven fabric according to claim 1;
an LED light source that irradiates the woven fabric with light;
a controller that controls the LED light source;
a secondary battery that provides electricity to the LED light source and the controller;
a solar cell that supplies electricity to the secondary battery; and
a sealing portion that seals the woven fabric, the LED light source, the controller, the secondary battery, and the solar cell; and
a support portion (243) for supporting the fabric and the LED light source.

13. A curtain comprising:
plural woven fabrics each being the woven fabric according to claim 1, an LED light source that irradiates the woven fabric with light, and a controller that controls the LED light source, on one side surface of the curtain; and
a solar cell, on the other side surface of the curtain.

14. A stairs lighting device arranged in a stair step riser portion, the stairs lighting device comprising:
the woven fabric according to claim 1;
an LED light source that irradiates the woven fabric with light; and
a controller that controls the LED light source,
wherein there are a plurality of the stairs lighting devices, the plurality of stair illuminating devices are located at different stair step riser portions, and the light emission state of the plurality of stairs lighting devices varies depending on the location of the plurality of stairs lighting devices.

15. A bag comprising:
the woven fabric according to claim 1, an LED light source that irradiates the woven fabric with light, and a controller that controls the LED light source, on a front surface of the bag; and
a solar cell, on a back side surface of the bag, and
wherein the LED light source also emits light to an inside of the bag.

16. A speaker device comprising:
a speaker; and
a lighting device,
wherein the lighting device includes the woven fabric according to claim 1, an LED light source, and a controller, and
the controller turns ON the LED light source in accordance with sound emitted from the speaker.

17. A monitor comprising:
a screen; and
a lighting device,
wherein the lighting device includes the woven fabric according to claim 1, an LED light source, and a controller, and the controller turns ON the LED light source in accordance with sound emitted from the screen.

18. The woven fabric (100) according to claim 1, wherein two fixing regions (52b) are present on both sides of the light emitting region (52a), and wherein two second decorative regions (51b) are present on both sides of the first decorative region (51a).

19. The woven fabric (100) according to claim 1, further comprising a pocket region (52c) adjacent to the fixing region (52b), which is configured to connect the woven fabric (100) to a light source.

20. The woven fabric (100) according to claim 1, wherein the seventh fiber (17), which is an optical fiber, is a weft.

21. A woven fabric (300) comprising:
an optical region (52) and a decorative region (51),
wherein the optical region (52) is a region where a seventh fiber (17) being an optical fiber is woven, and the decorative region (51) is a region where no optical fiber is present,
wherein the optical fiber region (52) includes a fixing region (52b) and a light emitting region (52a),
wherein the fixing region (52b) is a region where the seventh fiber is fixed; and
wherein the light emitting region (52a) is a region where light is emitted from the optical fiber toward a front side surface,
wherein the decorative region (51) includes a first decorative region (51a) and a second decorative region (51b),
wherein the first decorative region (51a) is a region adjacent to the light emitting region (52a), and the second decorative region (51b) is a region adjacent to the fixing region (52b),
wherein, in a surface layer (21) of the second decorative region (51b), a first fiber (11) is located in a Y direction, and a fifth fiber (15) is located in parallel to a Z direction, the fifth fiber (15) being woven with the first fiber (11),
wherein, in a back layer (23) of the second decorative region (51b), a third fiber (13) is located in the Y direction,
wherein, in an intermediate layer (22) of the second decorative region (51b), the seventh fiber (17) is not present,
wherein, in the surface layer (21) of the fixing region (52b), the third fiber (13) is located in the Y direction, and the fifth fiber (15) is located in parallel to the Z direction, the fifth fiber (15) being woven with the third fiber (13),
wherein, in the back layer (23) of the fixing region (52b), the first fiber (11) is located in the Y direction,
wherein, in the intermediate layer (22) of the fixing region (52b), the seventh fiber (17) being an optical fiber is located in parallel to the Z direction,
wherein the seventh fiber (17) being an optical fiber is interposed and fixed in a space between the surface layer (21) and the back layer (23) and is not woven into another fiber,
wherein in the light emitting region (52a), the decorative region (51a) and at left and right sides of the light emitting region (52a), the third fiber (13) are not present,
wherein the surface layer (21) of the first decorative region (51a) is the same as the surface layer (21) of the second decorative region (51b), and the first fiber (11) and a second fiber (12) are located in a Y direction, and a sixth fiber (16) is located in parallel to a Z direction, the sixth fiber (16) being woven with the first fiber (11) and the second fiber (12),
wherein, in the back layer (23) of the first decorative region (51a), the third fiber (13) is not present, and the fifth fiber (15) is located in parallel to the Z direction, and
wherein, in the intermediate layer (22) of the first decorative region (51a), tie seventh fiber (17) is not present.

22. The woven fabric (300) according to claim 21, wherein a plurality of first fibers (11) and third fibers (13) is present,
wherein, in the light emitting region (52a), the decorative region (51a) and at the left and right sides of the light emitting region (52a), third fibers (13) are present,
wherein a number of the third fibers (13) in the light emitting region (52a), the decorative region (51a) and at the left and right sides of the light emitting region (52a) is reduced.

* * * * *